(12) United States Patent
Eller

(10) Patent No.: US 11,897,570 B2
(45) Date of Patent: Feb. 13, 2024

(54) BICYCLE FRAME, FORK, AND FRAMESET AND METHOD FOR CONSTRUCTING THE SAME

(71) Applicant: Michael Eller, Mandeville, LA (US)

(72) Inventor: Michael Eller, Mandeville, LA (US)

(*) Notice: Subject to any disclaimer, the term of this patent is extended or adjusted under 35 U.S.C. 154(b) by 191 days.

(21) Appl. No.: 17/460,519

(22) Filed: Aug. 30, 2021

(65) Prior Publication Data
US 2023/0066986 A1    Mar. 2, 2023

(51) Int. Cl.
*B62K 19/20*     (2006.01)

(52) U.S. Cl.
CPC .................................. *B62K 19/20* (2013.01)

(58) Field of Classification Search
CPC ....... B23K 20/122; B62K 19/06; B62K 19/20
USPC ...................................................... 280/281.1
See application file for complete search history.

(56) References Cited

U.S. PATENT DOCUMENTS 4,699,233 A * 10/1987 Koga ..................... B62K 11/02
280/281.1

FOREIGN PATENT DOCUMENTS

JP      2005000967 A * 1/2005

\* cited by examiner

*Primary Examiner* — Minnah L Seoh
*Assistant Examiner* — Felicia L. Brittman

(57) ABSTRACT

A novel bicycle frameset created from a novel frame assembly and a novel fork assembly, where the components of the frame are joined together via the friction stir welding of the tubular components to partial bracket members and where the joining of the partial bracket members via friction stir welding rigidly connects the tubular components to create the frame, and where the components of the fork are joined together via friction stir welding of tubular components to a fork crown, and where the fork and frame combine form the frameset.

19 Claims, 27 Drawing Sheets

BICYCLE FRAME, FORK, AND FRAMESET AND METHOD FOR CONSTRUCTING THE SAME

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Common methods for joining two or more components to make up a bicycle frame or fork include using mechanical assembly, brazing, and fusion welding. Mechanical assembly of bicycle frames and forks typically involves bolts and nuts or other fasteners to mechanically lock various components together. Brazing processes typically utilize a filler metal that melts at lower temperature than the components to be joined. Tubes are typically inserted into lugs with preplaced filler metal and a heat source is applied from an induction heater, resistance heater, or vacuum heater, etc. to allow the braze filler metal to liquefy and flow into the crevices between the components. When the heat is removed the braze filler alloy solidifies and cools creating a metallurgical bond between the components. The process of fusion welding joins the components by creating a liquid phase or molten state of a lower temperature filler metal in addition to typically some level of liquid phase or molten state of the components themselves. Subsequently, a strong metallurgical bond is formed at the joint as they components solidify together. Various fusion welding processes exist for bicycle joining including: tungsten inert gas (TIG), Metal Inert Gas (MIG), laser beam welding (LBW), and others.

A typical welded bicycle has a front and rear triangle of tubes that are joined together to allow insertion of a fork and front tire at the forward portion of the front triangle and a rear tire positioned at the aft portion of the rear triangle. All the tubes have common names based on their location on the frame and fork. Generally, a bicycle frame has a forward-facing Top Tube (TT), a downward facing Down Tube (DT), a vertical facing Seat Tube (ST), a vertical facing head tube (HT), 2 upward facing Chain Stay (CS) tubes, and 2 downward facing Seat Stay (SS) tubes.

Friction welding is a method for joining materials together that is considered a solid-state joining process because the heat generated by the process does not exceed the melting temperature of the workpieces. Generally, for friction welding one component is rotated in relative motion with respect to the other component and comes into contact with the other component to generate sufficient frictional heating to cause plasticization. Once plasticization occurs, portions of the material are upset from the applied force and a resulting metallurgical bond is formed. Friction welding has been used in various manufacturing industries for decades, but has not yet been adopted for construction of bicycles frames and forks.

One variation of friction welding is friction stir welding (FSW) that uses a external, non-consumable rotating tool to generate sufficient frictional heat to join two or more materials together, as described in U.S. Pat. Nos. 6,648,206 and 6,779,704. FSW is also a solid-state process that has significant quality and cost benefits because it avoids many problems associated with rapid solidification of molten material that occurs in traditional fusion welding and brazing processes. The resulting FSW joint has a dynamically recrystallized fine grain microstructure that produces higher mechanical properties than equivalent fusion welded and brazed joints. FSW is unique in that it can join metal alloys that are considered unweldable by conventional fusion welding methods. FSW can also join dissimilar alloys (e.g. 7075 to 2024), dissimilar metals (i.e. titanium to steel), and metal matrix composites with higher quality joints compared to conventional fusion welding methods There is a plethora of FSW patents that teach the benefits of using the technique to obtain welds that have beneficial characteristics over conventional fusion welding processes. Benefits of FSW include reduced residual stresses, reduced distortion, elimination of gas fumes, elimination of porosity, elimination of splatter, and superior mechanical properties. Since the FSW process utilizes a non-consumable tool, there is no need for consumables such as: filler wire, gas shielding, and electrodes. The FSW process can adapt to imperfect fit up tolerances as well as presence of oxides in the weld region prior to welding. Because of the aforementioned advantages of FSW over conventional fusion welding processes, many industries have adopted the technology in order to create a higher quality and lower cost product for their customers. A major example is the widespread FSW adoption into the spaceflight hardware sector where FSW has replaced fusion welding for primary structures such as: cryogenic fuel tanks, crew vehicles, launch vehicle fairings, and more.

Despite all the advantages of FSW, it has been adopted for very few consumer products. One of the biggest setbacks for further FSW adoption is the need to redesign an existing product to enable the external, non-consumable tool to apply force, rotate, and translate along the joint interface. In most cases, a product designed for fusion welding must undergo a massive redesign effort to enable FSW to be used for joining. In many cases, it is not practical to make the required changes or the non-recurring investment is exceedingly expensive.

FSW is a very pertinent solution when a product requires a high level of quality, higher mechanical properties, and in many cases higher product lifetime. Accordingly, bicycle frames and forks could take advantage of these benefits with a novel design and method for construction.

BRIEF SUMMARY OF THE INVENTION

The present invention is generally directed to a novel bicycle frame assembly and the method for assembling the same. One objective of the present invention is to provide a bicycle frame assembly and method with frames and forks that enable use of solid-state welding processes for construction.

In one embodiment, the present invention is directed to a novel bicycle frameset assembly, the assembly including a frame and fork all joined together to provide a bicycle frame assembly, which can be formed using solid-state welding processes. The frame preferably includes a top tube, head tube, down tube(s), seat tube, chain stay tubes, seat stay tubes, a top bracket shell, a bottom bracket shell, and rear dropouts, while the fork preferably includes a steerer tube, crown, fork tube(s), and front dropouts.

In one embodiment, the present invention is directed to a novel method for assembling a bicycle frameset, the method utilizing friction stir welding to join tubular components to partial tubular components and to joint tubular components to structural connector components. The tubular components (such as seat tube, top tube, etc.) are engaged with the partial tube components (such as partial bracket components, etc.) and/or the structural connector components (such as the dropouts, etc.) and the end surface of the tubular component acts as an interface with the interior surface of the partial tube or structural connector components. A friction stir welding tool is used to friction stir weld along the interface of these components to join the components together and ultimately build the frame, fork, and frameset of the present invention.

These and other objects, features, and advantages of the present invention will become better understood from a consideration of the following detailed description of the preferred embodiments and appended claims in conjunction with the drawings as described following:

DETAILED DESCRIPTION OF THE INVENTION

Figure 1:
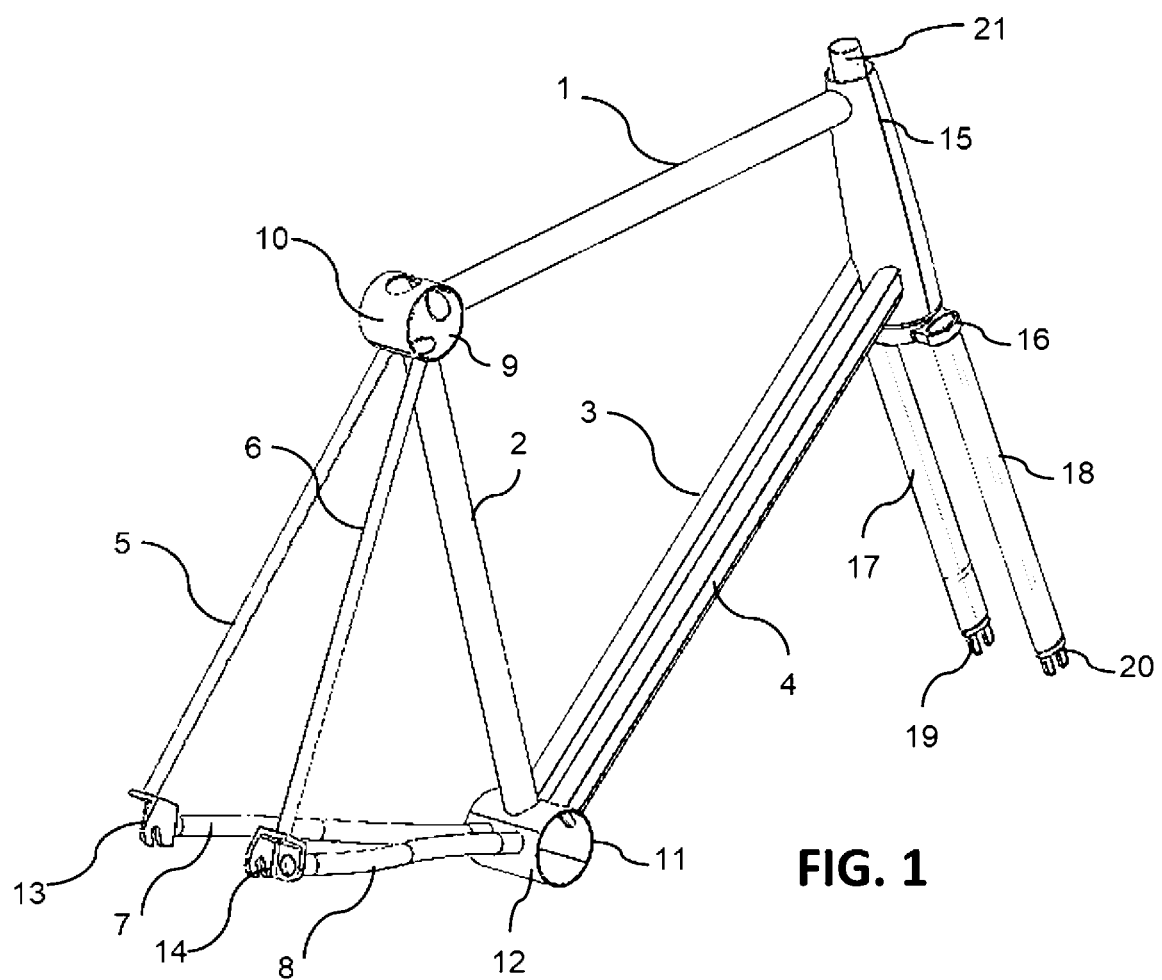
FIG. 1 illustrates a perspective view of a bicycle frameset according to one embodiment of the present invention.
Figure 2:
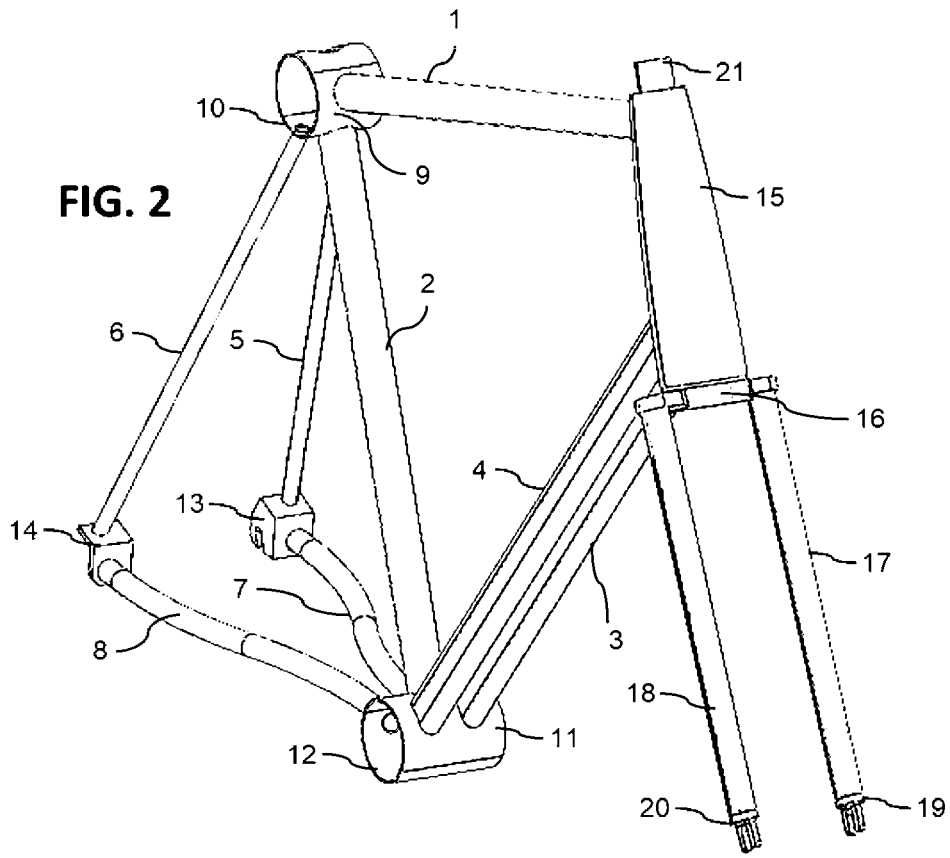
FIG. 2 illustrates a perspective view of a bicycle frameset according to one embodiment of the present invention.
Figure 3:
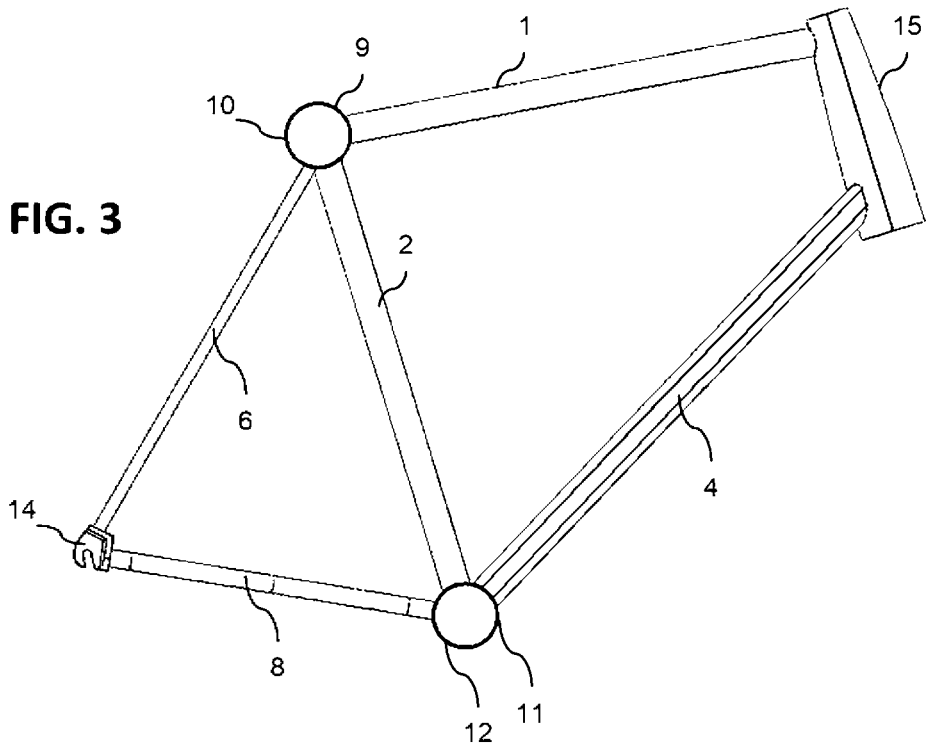
FIG. 3 illustrates a side view of a bicycle frame according to one embodiment of the present invention.

Generally speaking, the present invention is directed to a novel bicycle assembly (which may be a frame assembly, a fork assembly, or a frameset assembly that combines the fork assembly and frame assembly) and the method for constructing the same. Generally speaking, the frameset includes a frame and a fork, where the term frame is the main part (or assembly of parts) of the frameset onto which other components, like wheels, are attached, and the fork is the part (or assembly of parts) that holds the front wheel, such that the frameset and their parts form the full bicycle when all of the other components are attached to the frame and fork. As isometric rear view of the preferred embodiment of the frameset of the present invention is shown in FIG. 1 and an isometric front view of the preferred embodiment of the frameset of the present invention is shown in FIG. 2. These figures show the frameset as the combination of the frame and fork as described.

As noted, the frame is the portion of the frameset that is configured to receive other components for full bicycle assembly. The components that are configured to be attached to the frame include the back wheel, seat post and seat, bottle cage mounts, and the bicycle drive system (chains, gears, and pedals), as shown, for example in FIG. 44. On the other hand, as noted, the fork is the portion of the frameset that is configured to receive the front wheel for full bicycle assembly. While in one embodiment the present invention is directed to the a full bicycle assembly incorporating the frameset in addition to these, in another embodiment, the present invention is directed only to the frameset itself (or individually to the frame or individually to the fork, as each component is a novel assembly in addition to the novelty of the frameset assembly itself), such that the user can assemble the full bicycle using other components (such as seat, wheels, and pedals) that are specific to the needs of the user. In this regard, the preferred embodiment of the present invention may be described with particular reference to the frameset itself, but it is contemplated that the invention is not so limited, and that the invention also encompasses a bicycle incorporating the frameset described herein.

Turning to FIGS. 1-16, the preferred embodiment of the frame of the present invention may be described. Generally speaking, the frame includes a top tube 1, head tube, one or more down tubes, a seat tube 2, one or more chain stay tubes 7,8, one or more seat stay tubes 5,6, a top bracket shell (made of a first partial bracket member 9 and a second partial bracket member 10), a bottom bracket shell (made of a first partial bracket member 11 and a second partial bracket member 12), and one or more real dropouts 13,14. Generally speaking, the components of the frame are assembled such that the frame includes a front triangle (or substantially triangular shape, as shown) and rear triangle (or substantially triangular shape, as shown) made of tubular members such that the frame is effectively separated into two halves: a front half effectively created by the top tube 1, seat tube 2, and down tubes 3,4 and a back half effectively created by the seat tube 2, seat stay tubes 5,6, and chain stay tubes 7,8. As shown, the front half may not be a true triangle because the top tube 1 and down tubes 3,4 do not meet to form the third angle of the triangle because they, instead, each join at separate ends of the head tube 15. Nonetheless, because of the sloped nature of the top tube 1, down tubes 3,4, and seat tube 2, the front half can still be said to have a generally triangular shape (as illustrated).

The top tube 1 (which may be referred to as the cross-bar) connects the top of the head tube 15 to the top of the seat tube 2, as shown. In the preferred embodiment of the present invention, the top tube 1 is slightly inclined from the top bracket shell 9,10 to the head tube 15, such that the top tube 1 slopes downward toward the top bracket shell 9,10. This sloped nature of the top tube 1 may, for example, help facilitate easier mounting and dismounting by the user of the bicycle. In one embodiment, the top tube 1 may be configured to receive control cables (which help, for example, control the brakes of the fully assembled bicycle) through an internal routing system, which protects the control cables from damage.

Figure 17:
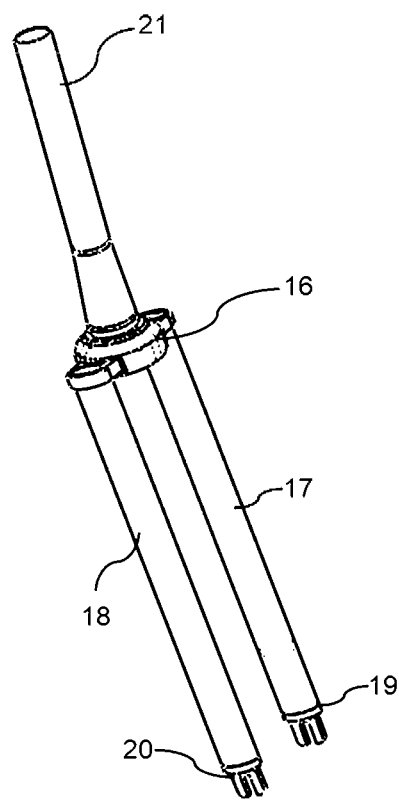
FIG. 17 illustrates a perspective view of a fork of a bicycle frameset according to one embodiment of the present invention.
Figure 18:
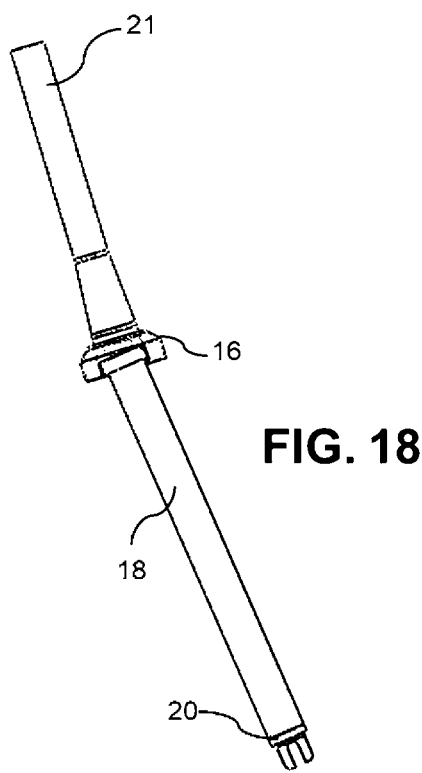
FIG. 18 illustrates a side view of a fork of a bicycle frameset according to one embodiment of the present invention.
Figure 19:
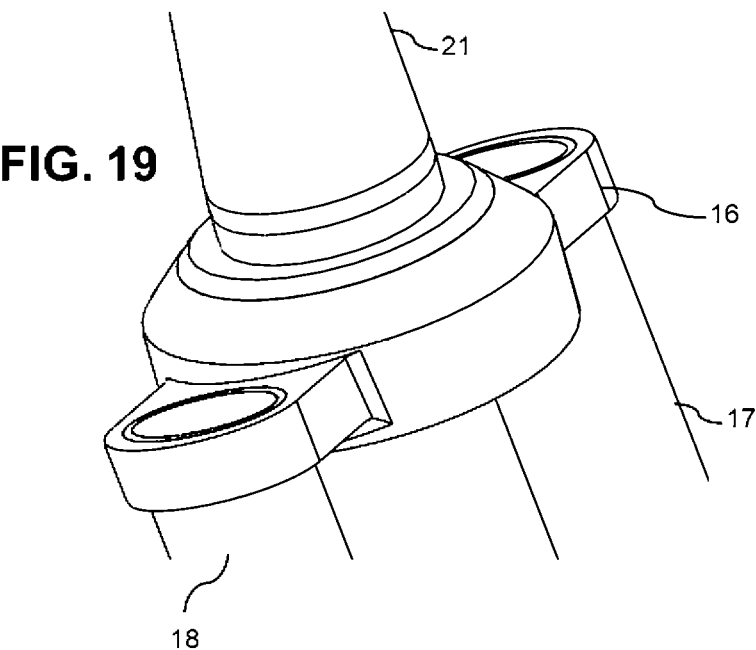
FIG. 19 illustrates a top perspective view of a crown of a fork of a bicycle frameset according to one embodiment of the present invention.
Figure 20:
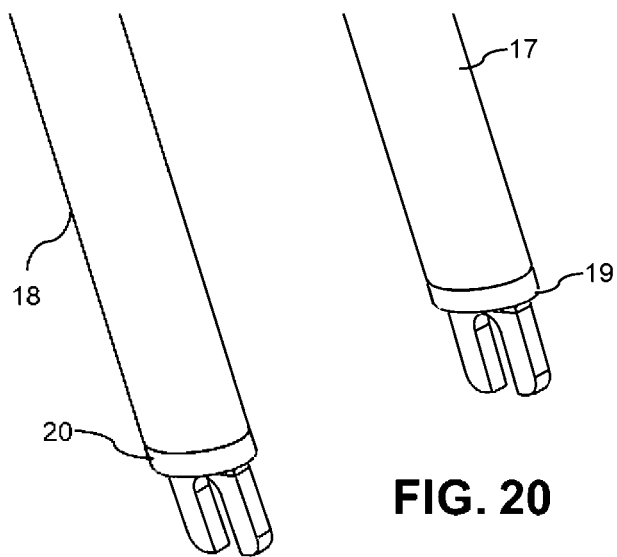
FIG. 20 illustrates a view of front fork dropouts of a fork of a bicycle frameset according to one embodiment of the present invention.
Figure 21:
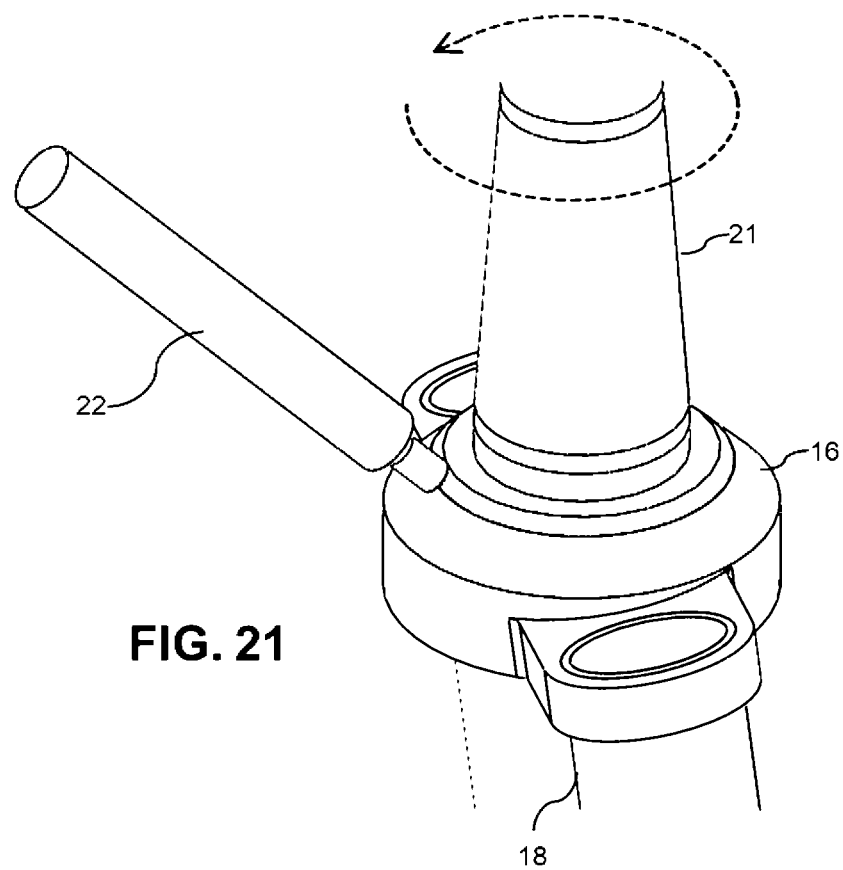
FIG. 21 illustrates a portion of a method of construction of a bicycle fork according to one embodiment of the present invention, particularly showing a friction stir welding tool path circumscribing a tube collar (of a steerer tube) to join it to a structural junction (at the fork crown).

The head tube 15 is configured to receive the steerer tube 21 of the fork (described more fully below) and contains the bearings for the fork via the steerer tube 22, such that the head tube 15 acts as the component for joining the frame (FIG. 3, for example) and fork (FIG. 17, for example) to create the frameset (FIG. 1, for example). The head tube 15, as shown, may have a generally conical shape having an internal compartment configured to receive the steerer tube 21 of the fork. The steerer tube 21 may interface with the inside surface of the head tube 15 as known in the art.

The down tubes 3,4 of the present invention connect the head tube 15 to the bottom bracket shell 11,12, as shown. In one embodiment of the frame of the present invention, two down tubes 3,4 are used. This is a novel departure from existing bicycles which universally utilize a single downtube. However, given the novel nature in which the frameset components are adjoined (as discussed more below), the frameset of the present invention is capable of utilizing two twin down tubes 3,4.

Figure 39:
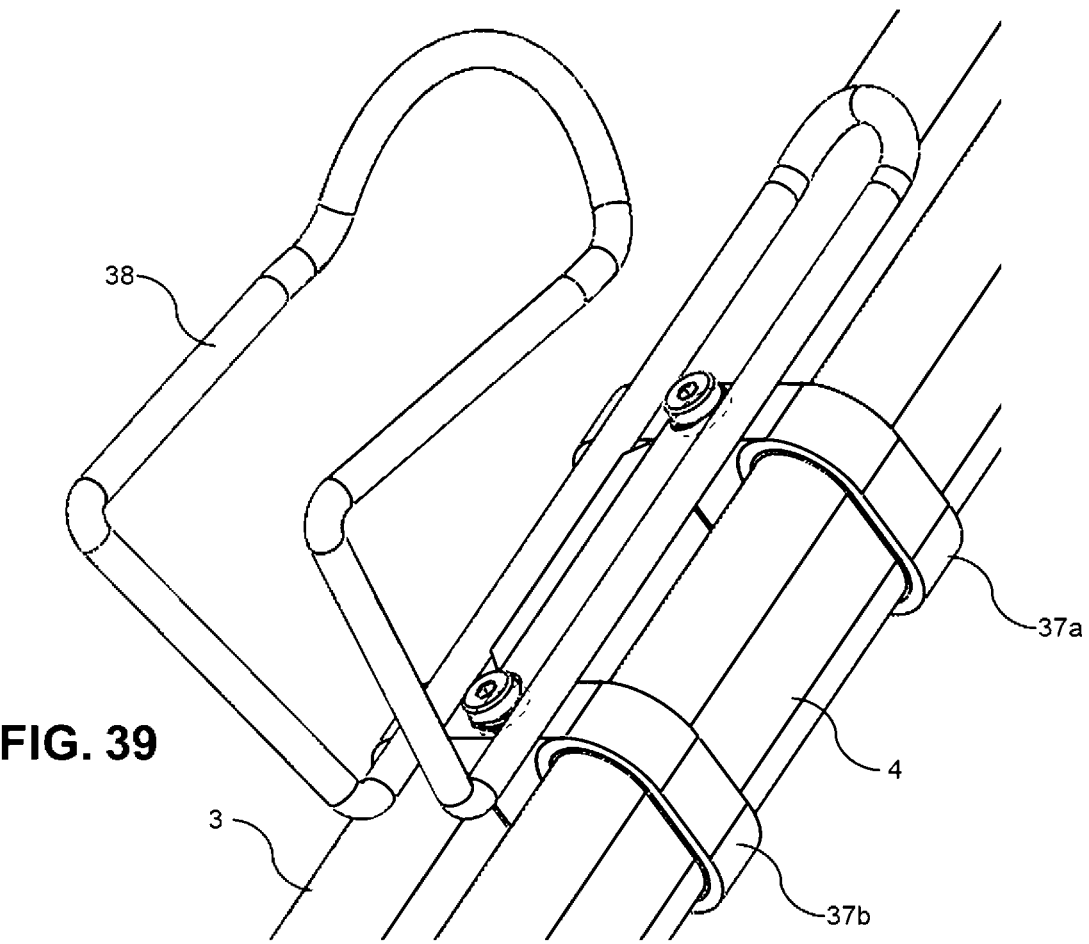
FIG. 39 illustrates one view of a bottle cage and mounting pieces mounted on the down tubes of a bicycle frame according to one embodiment of the present invention.
Figure 40:
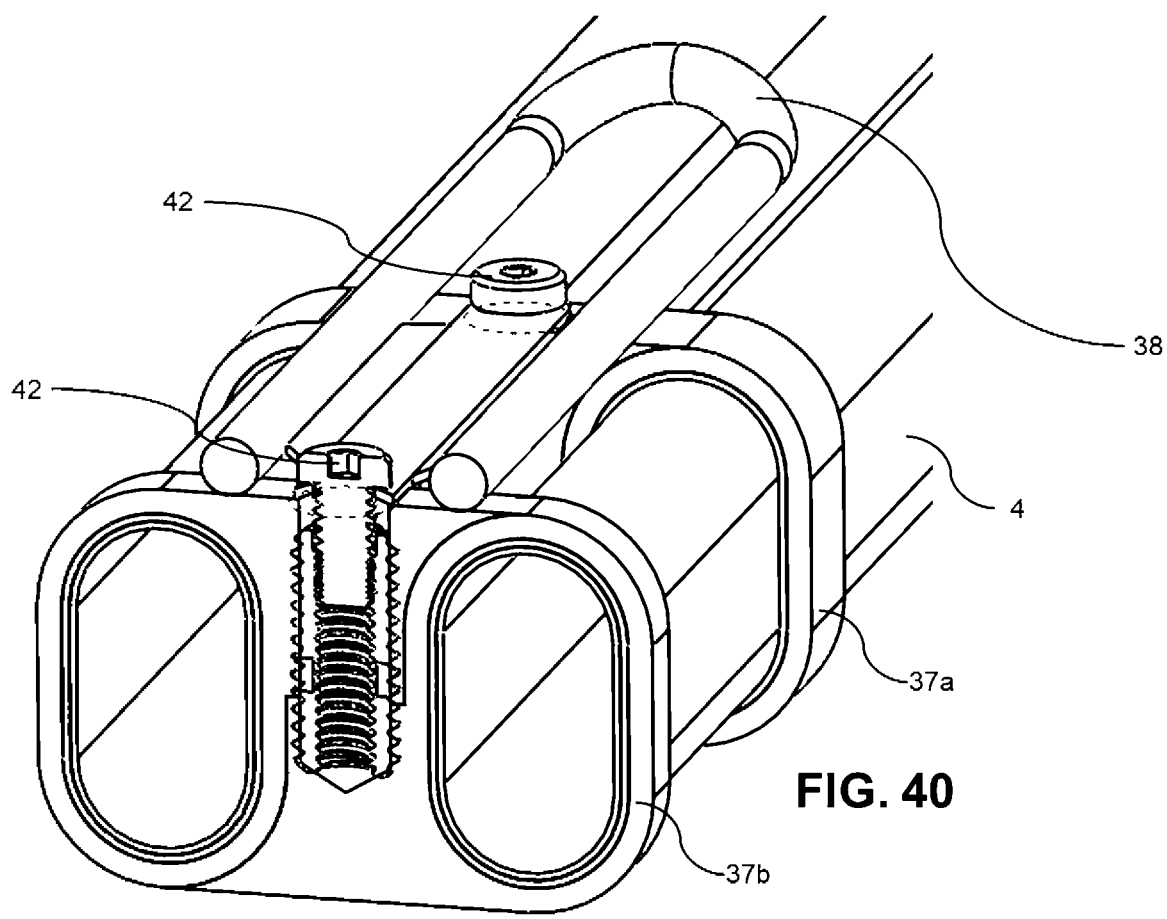
FIG. 40 illustrates a view of a bottle cage and mounting pieces mounted on the down tubes of a bicycle frame according to one embodiment of the present invention.
Figure 41:
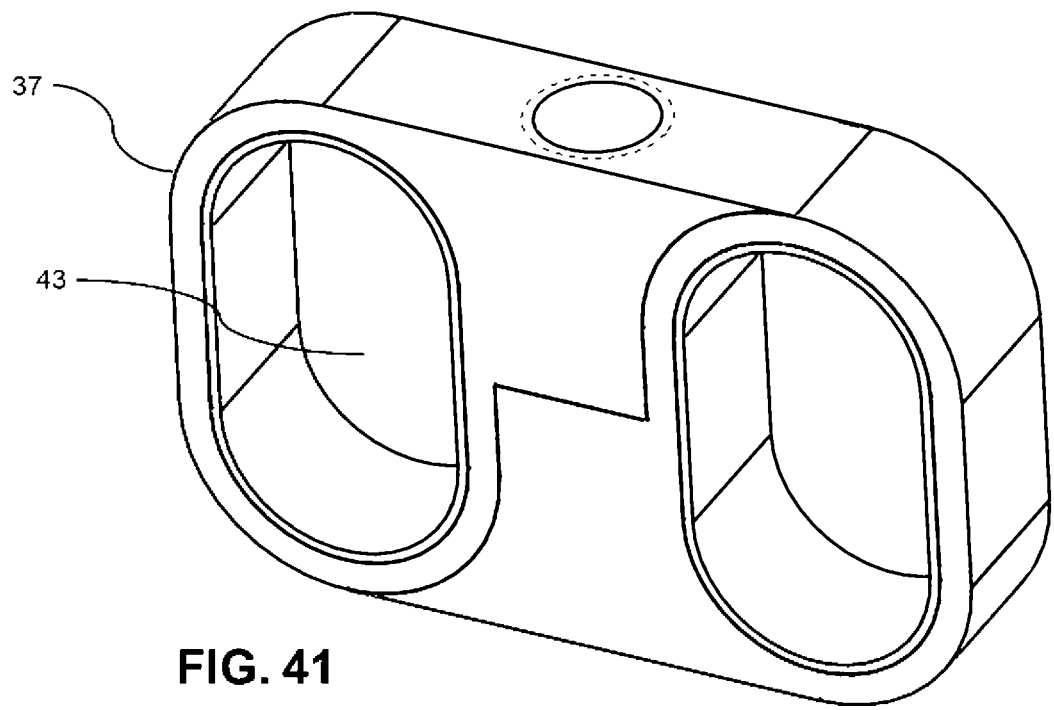
FIG. 41 shows one embodiment of mounting pieces for mounting a bottle cage to the down tubes of a bicycle frame according to one embodiment of the present invention.
Figure 42:
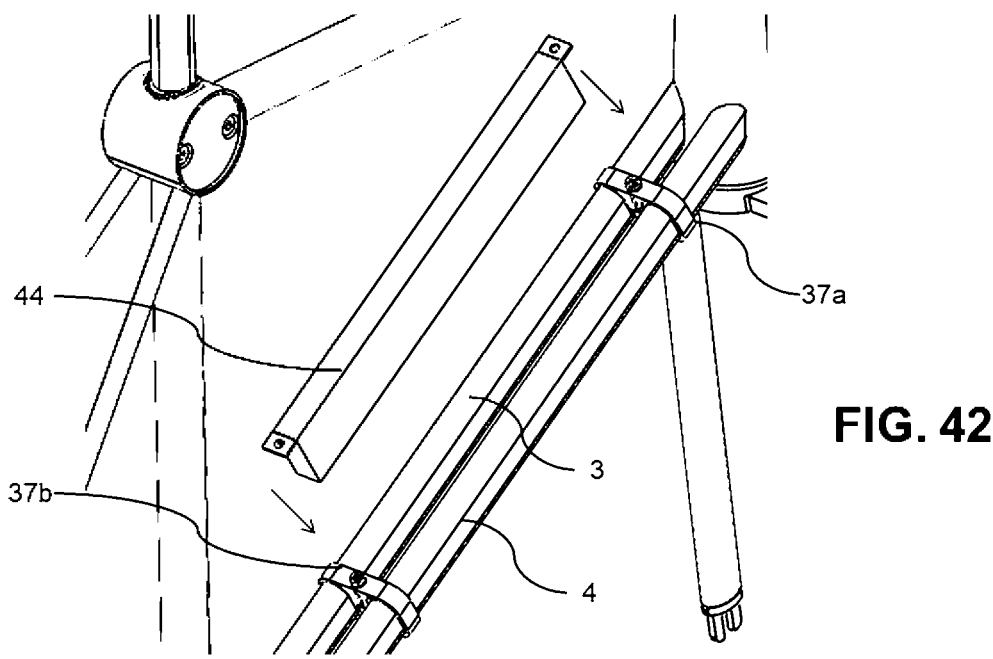
FIG. 42 shows one embodiment of mounting pieces for mounting a battery between and/or to the down tubes of a bicycle frame according to one embodiment of the present invention.
Figure 43:
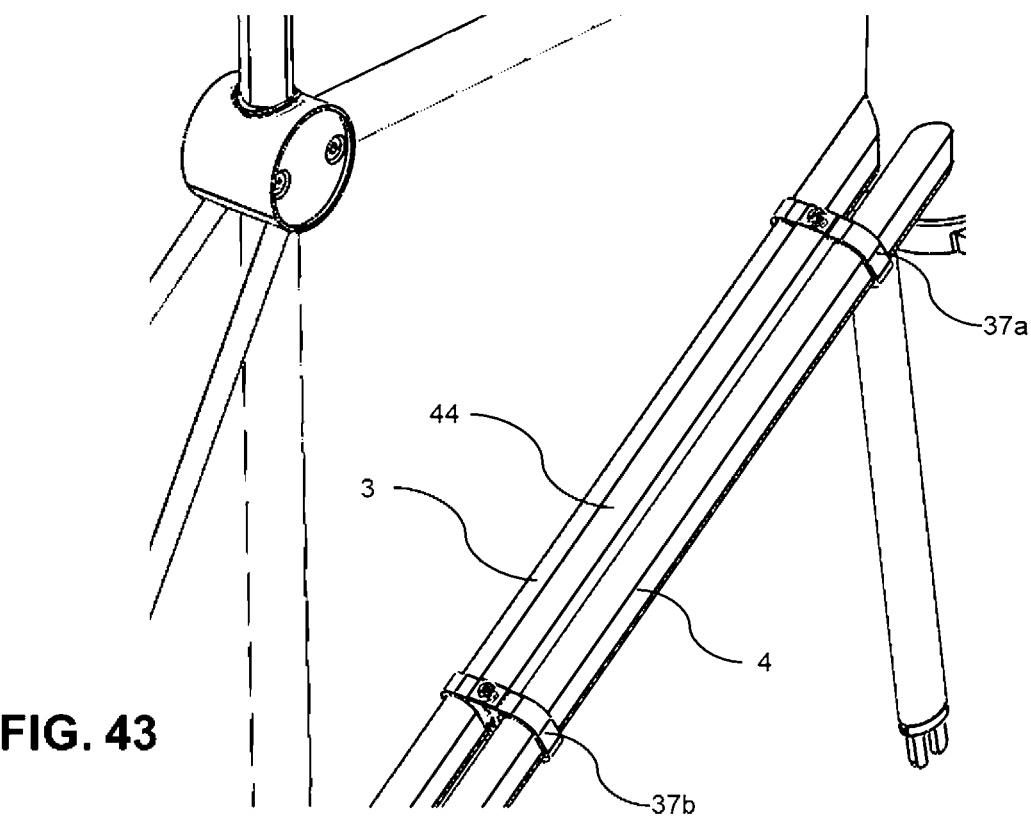
FIG. 43 shows one embodiment of mounting pieces for mounting a battery between and/or to the down tubes of a bicycle frame according to one embodiment of the present invention, with battery inserted between the down tubes.

In the preferred embodiment, one or more bottle cage mounts are intended to be fastened to and adjusted along the down tubes 3,4. As shown in FIGS. 39-40, for example, one or more bottle cage mounts 37 can be adjoined to the down tubes 3,4. Each of the mounts 37 includes two openings 43, each for receiving one of the down tubes 3,4, so that the mounts 37 extend around the down tubes 3,4 and the down tubes 3,4 extend fully through the mounts 37. Because each of the down tubes 3,4 is positioned inside the mount openings 43 of the mounts 37, the mounts 37 serve to rigidly connect the down tubes 3,4. In one embodiment, a bottle cage 38 is affixed to the mounts 37 so that the user of the bicycle can rest a bottle on the down tubes 3,4 to remain hydrated during use of the bicycle. The mounts 37 also serve to allow for the adjustment of the stiffness profile of the down tubes 3,4. The mounts 37 can be adjusted along the down tubes 3,4 to provide greater or less distance between the mounts 37. In one embodiment, a battery 44 can be inserted between the down tubes 3,4 and fastened to the mounts 37 (each end of the battery 44 fastened to a different mount 37a, 37b, where the mounts 37 are separated by a distance equal to the length of the battery 44, as shown, for example in FIGS. 42-43), allowing for the use of the frameset of the present invention with electric bike configurations.

Figure 8:
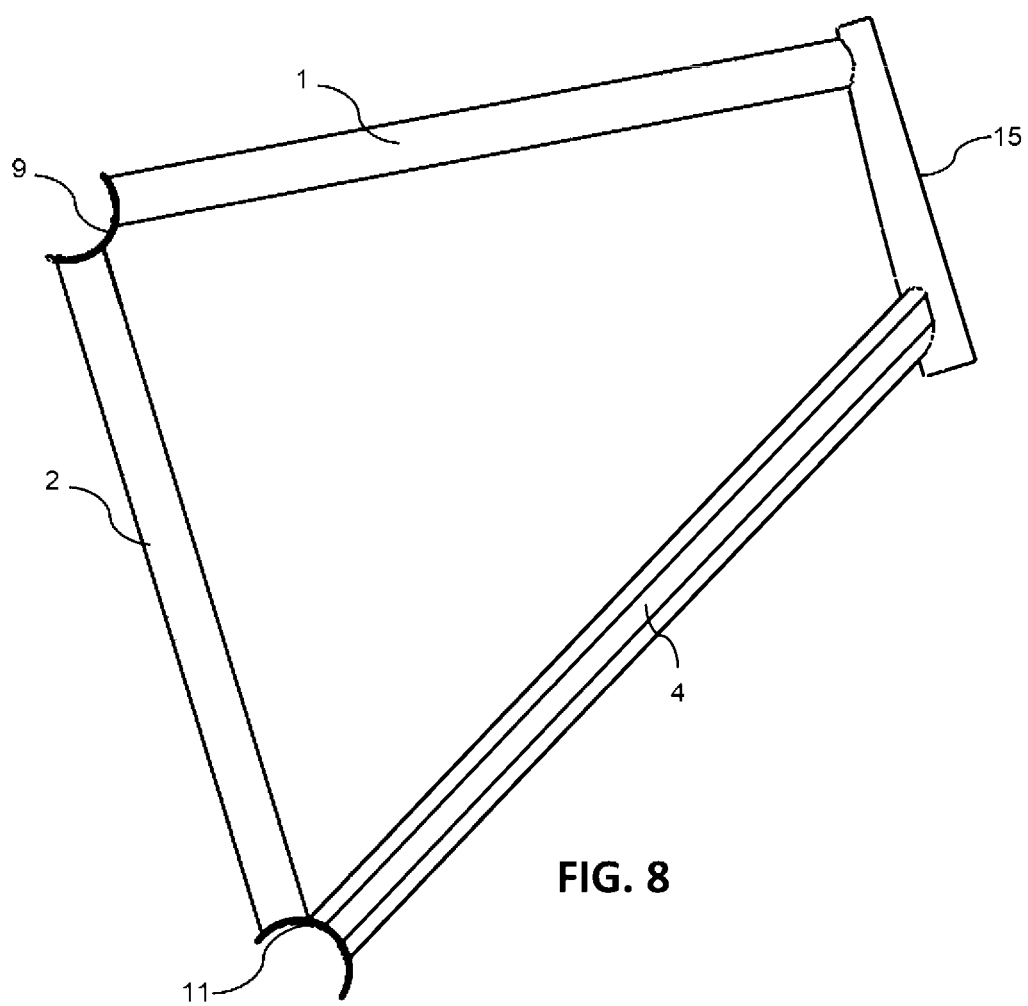
FIG. 8 illustrates a side view of a first portion of a bicycle frame according to one embodiment of the present invention.

The seat tube 2 of the present invention extends between the top bracket shell and bottom bracket shell (via the seat tubes 2 connection to one of the top bracket partial shell components 9 and one of the bottom bracket partial shell components 11, as shown in FIG. 8 and discussed more fully below) such that the seat tube 2 extends between the top tube 1 and down tubes 3,4 at the opposite end as the head tube 15. The seat tube 2 is configured to receive the seat post 36, which connects to frame at one end via the seat tube 2 and to the seat 35 of the fully assembled bicycle at its other end. In the preferred embodiment, the seat post 36 is adjustable within the seat tube 2, allowing the seat 35 of the fully assembled bicycle to be adjusted to different heights depending on the user's preferences. A quick release lever may be utilized to facilitate the height adjustment of the seat post 36.

The seat stay tubes 5,6 connect the top of the seat tube 2 (via its connection point at the top bracket shell partial shell component as discussed more fully below) to the real dropouts 13,14, forming (along with the chain stay tubes 7,8) the rear portion of the frame. In this regard, because the real dropouts 13,14 are positioned at a lower height than the top bracket shell, the seat stay tubes 5,6 are sloped downward from the top bracket shell to the real dropouts 13,14, perhaps substantially. In the preferred embodiment, two seat stay tubes 5,6 are used, as shown for example in FIGS. 1-2. Each seat stay tube connects with one of the chain stay tubes 7,8 (discussed below) at a joint created by the real dropouts 13,14. The frameset is designed such that when the bicycle is fully assembled, the rear wheel fits in the space between the seat stay tubes 5,6 and chain stay tubes 7,8.

The chain stay tubes 7,8 connect the bottom bracket shell to the real dropouts 13,14. The chain stay tubes 7,8 (along with the seat stay tubes 5,6) form the rear portion of the frame. In the preferred embodiment, the chain stay tubes 7,8 slope downward from the real dropouts 13,14 to the bottom bracket shell. Furthermore, as noted above, there are preferably two chain stay tubes 7,8, each of which connects to its corresponding seat stay tube via the real dropouts 13,14. As shown in FIGS. 1-2, in one embodiment, the chain stay tubes 7,8 are curved along a horizontal plane in order to provide adequate space for the wheel components when the bicycle is fully assembled, where the rear wheel fits in the negative space between the chain stay tubes 7,8.

Figure 4:
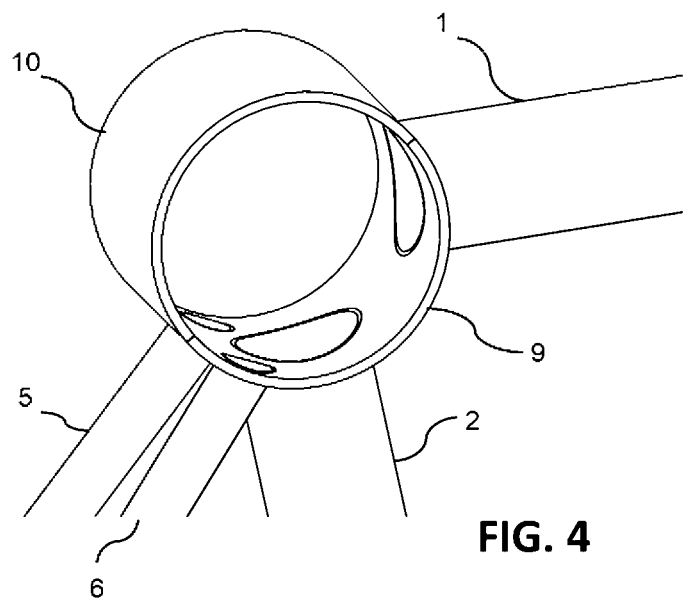
FIG. 4 illustrates a side view of a top bracket of a bicycle frame according to one embodiment of the present invention.

The top bracket shell consists of a short cylindrical tube that runs side to side in relation to the frame and acts as the joint for connecting the seat stay tubes 5,6, seat tube 2, and top tube 1, as shown for example in FIGS. 1-2. The top bracket shell is formed by joining two partial bracket shell members 9,10 (each preferably a semi-circle) to form the cylindrical top bracket, as discussed more fully below and shown in FIG. 4. As discussed below, each of the partial bracket shell members 9,10 for the top bracket shell is connected to its corresponding tube components. For example, in one embodiment the front side partial bracket shell member 9 of the top bracket is connected to the top tube 1 and seat tube 2 and the back side partial bracket shell member 10 of the top bracket is connected to the seat stay tubes 5,6, such that when the top bracket is formed by joining the front side partial bracket shell member 9 and back side partial bracket shell member 10, the top bracket connects the top tube 1, seat tube 2, and seat stay tubes 5,6. In another embodiment, as shown in FIG. 4, the top bracket front side partial bracket shell member 9 is connected to the top tube 1, seat tube 2, and seat stay tubes 5,6, while the back side partial bracket shell member 10 includes the hole for receiving the seat post 36, such that when the two partial bracket shell members 9,10 are joined together via friction stir welding (as described more below) to create the top bracket shell, the tube components are rigidly connected and the seat post can be received into the top bracket shell.

Figure 5:
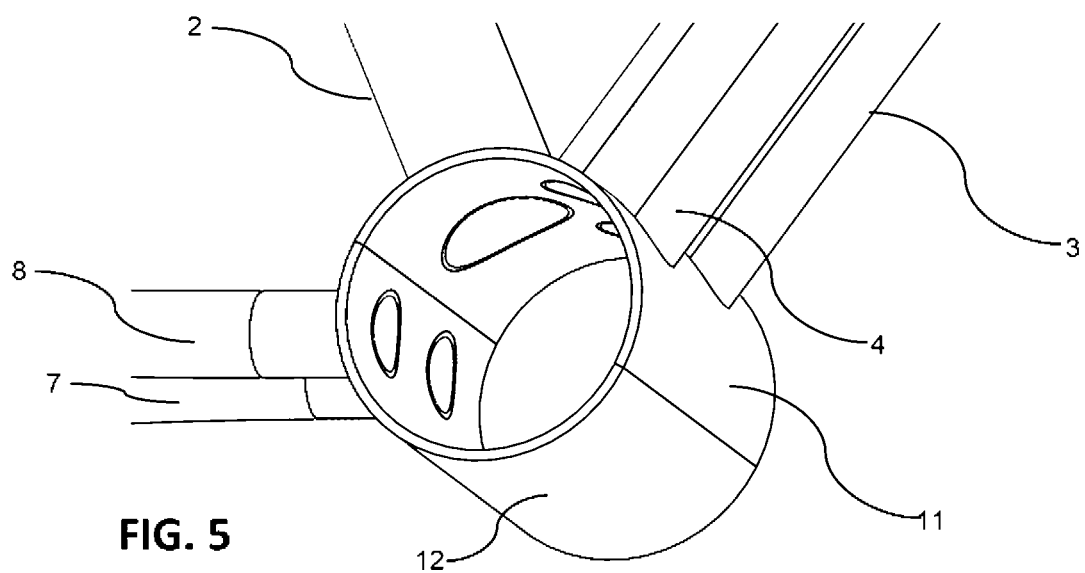
FIG. 5 illustrates a side view of a bottom bracket of a bicycle frame according to one embodiment of the present invention.
Figure 6:
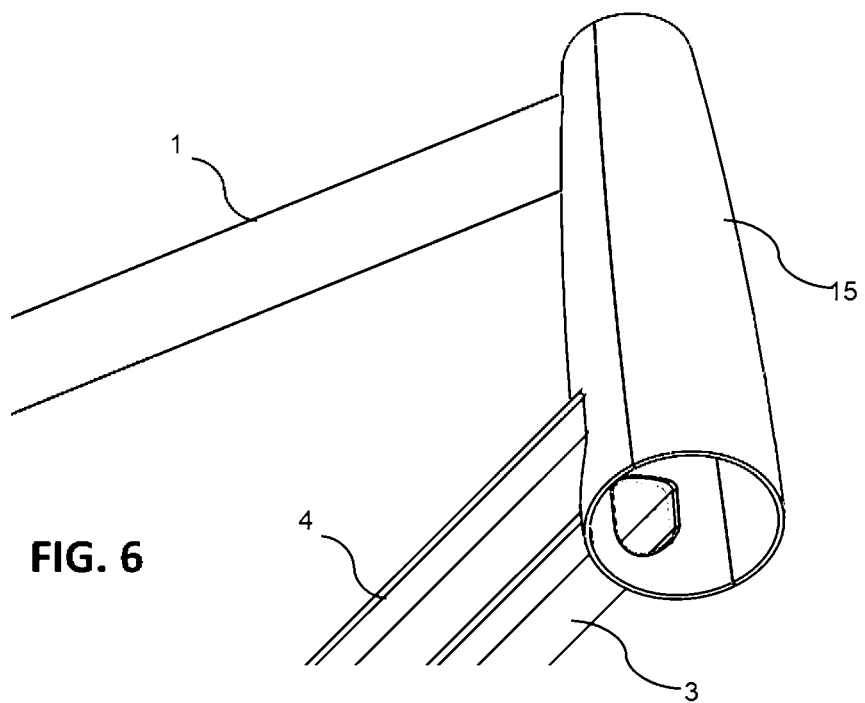
FIG. 6 illustrates a perspective view of a head tube of a bicycle frame according to one embodiment of the present invention.
Figure 7:
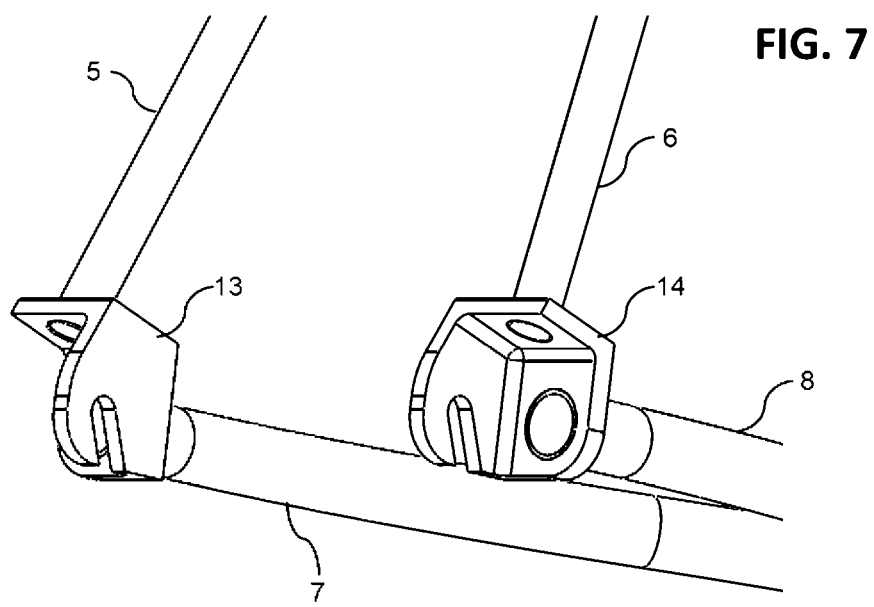
FIG. 7 illustrates a perspective view of rear dropouts of a bicycle frame according to one embodiment of the present invention.

The bottom bracket shell consists of a short cylindrical tube that runs side to side in relation to the frame, and is configured to receive and hold a bottom bracket. The bottom bracket shell acts as the joint for connecting the chain stay tubes 7,8, seat tube 2, and down tubes 3,4, as shown for example in FIG. 5. The bottom bracket shell also holds the axis around which the pedals and cranks rotate. A crankset is installed in the bottom bracket and pedals attached to a crankset allow a user to rotate the crankset and propel the bicycle, as is known in the art. Like the top bracket, the bottom bracket is formed by joining two partial bracket shell members 11,12 (each preferably a semi-circle) to form the cylindrical tube bottom bracket shell, as discussed more fully below and shown in FIGS. 14-15. As with the top bracket, its preferred that each of the partial bracket shell components 11,12 of the bottom bracket is attached to corresponding tubular members of the frameset. For example, as shown in FIG. 5, the backside partial bracket shell 12 of the bottom bracket may be connected to the chain stay tubes 7,8 while the frontside partial bracket shell component 11 of the bottom bracket may be connected to the seat tube 2 and down tubes 3,4, such that when the bottom bracket is fully formed by joining the backside partial bracket shell member 12 and frontside partial bracket shell member 11, the bottom bracket (via the bottom bracket shell) acts as the connection point between the chain stay tubes 7,8, seat tube 2, and down tubes 3,4. When the top bracket shell and bottom bracket shell are both fully formed from their partial tube members, the front triangle and back triangle of the frameset are effectively connected. The process of joining the tubes of the framesets to the partial tubular members of the brackets and the process of joining each of the partial tubular members of the brackets together to form the whole bracket is described more fully below.

The real dropouts 13,14 are notches on the back half of the frame, connecting the chain stay tubes 7,8 and the seat stay tubes 5,6, where the real dropouts 13,14 are configured to receive the axle of the rear wheel when the bicycle is fully assembled, serving as the mechanism by which the wheel is attached to the frame.

In one embodiment, a seat post 36 adjustment mechanism can be incorporated into the top bracket, which allows the seat post 36 to be adjusted to different heights. In the preferred embodiment, a seat post 36 adjuster compressive element 34 facilitates the adjustment of the seat post 36, as shown in FIGS. 34-37. The seat post adjustment compressive element includes two pieces 34, configured to be placed on either side of the seat post 36 when the seat post 36 is inserted into the top bracket and seat tube 2, and where the compression pieces 34 are configured to be compressed toward one another to hold the seat post 36 at the desired height. Adjustment screws 39 positioned through the seat post adjuster compressive elements 34 facilitate loosening and tightening the compression of the pieces 34, such that when the compressive element 34 is loosened sufficiently, the seat post 36 can be moved to a desired height (or removed from the top bracket entirely). When the adjustment screws 39 are tightened, the pieces 34 of the compressive element 34 are compressed together, holding the seat post 36 at its then current position.

Figure 38:
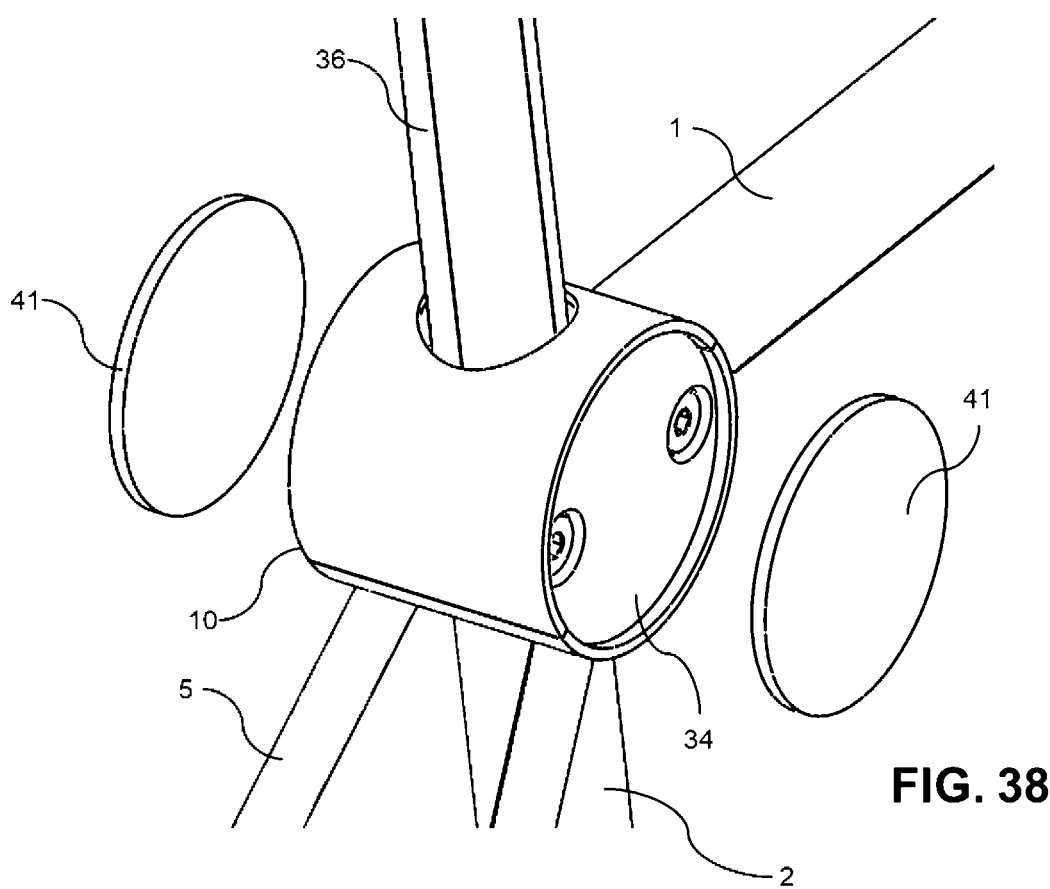
FIG. 38 illustrates one view of a constructed top bracket of a bicycle frame according to one embodiment of the present invention, implementing a seat post adjuster mechanism for adjusting a seat post received in the top bracket and having LED backlit medallions for placement at the top bracket.

In one embodiment, as shown for example in FIG. 38, the top bracket is configured to receive one or more medallions 41, which act as surfaces or caps on the end of the tubular configuration of the top bracket. In one embodiment, the medallions 41 may be LED backlit to show logos of the bicycle manufacture, bicycle racing team logo, or other similar logo or design. A seal (such as one made of elastomer, rubber, or other material) can be place around the circumference of the medallion 41 to prevent moisture intrusion into the internal area of the top bracket. In other embodiments, the top bracket may be used to hold a safety light, turn signal, and/or reflector.

As noted above, the frameset of the present invention is created from the frame assembly (which is described above) and the fork assembly. The fork, which is shown for example in FIGS. 17-32, is the mechanical assembly that integrates the frame to the front wheel and handles, allowing for steering of the bicycle when fully assembled. The fork includes a steerer tube 21, a crown 16, fork tube 17,18 and front dropouts 19,20. The fork is configured to integrate with the frame via the steerer tube 21, which connects to the frame via an interface with the head tube 15 of the frame. The steerer tube 21 is a tube on the top of the fork, where the steerer tube 21 is configured to be inserted into and through the head tube 15 of the frame, as shown. The steerer 21 tube is configured to connect to the front wheel on its bottom end (through the front fork tubes 17,18 and front dropouts 19,20) and to the handlebars on its top end, allowing the steerer tube 21 to act as the front steering axle of the fully assembly bicycle. The crown 16 is the brace that acts as the connection point between the steerer tube 21 and the fork tubes 17,18. The fork tubes 17,18 (which may be referred to as blades) extend downwardly from the crown 16, each extending from different sides of the crown 16 as to create negative space between the fork tubes 17,18. The negative space between the fork tubes 17,18 is intended to receive the front wheel so that each of the fork tubes 17,18 is positioned on a different side of the wheel. The front dropouts 19, 20 are notches on the bottom of the fork tubes 17,18 and act as the mechanism for receiving the front wheel and connecting the front wheel to the fork tubes 17,18 (and thus the fork assembly). The front dropouts 19,20 are preferably U shape notches that extend downwardly from the fork tubes 17,18 (with each front dropout corresponding to a single fork tube), so that the front wheel can easily be inserted or removed from the notches, allowing for quick assembly and disassembly of the bicycle.

Turning now to FIGS. 9-16 and 21-32, the method for constructing and assembly the frameset (including each of the frame and fork) of the present invention may be described.

As noted above, the frameset generally includes a frame and a fork, where the frame, as discussed in depth previously, includes a number of tubular components connected in a double-triangular configuration, where each of the triangular configurations is connected to the other via a top bracket shell and bottom bracket shell. So, for example, the front triangular configuration (or substantially triangular configuration) includes a top tube 1, seat tube 2, and down tubes 3,4 that form the sides of the generally triangular shape, while the back triangular configuration includes seat stay tubes 5,6, chain stay tubes 7,8, and the seat tube 2 that form its generally triangular configuration. In this regard, the seat tube 2 acts as a side of both the front triangular configuration and back triangular configuration, while the top bracket (the shell of which the top end of the seat tube 2 is attached) and bottom bracket (the shell of which the bottom end of the seat tube 2 is attached) act as joints at corners of both the back triangular configuration and front triangular configuration of the frameset.

In the preferred embodiment, and generally speaking, the frame is constructed from full round tubular members (e.g.

the top tube 1, seat tube 2, etc.) with ends inserted through exterior surfaces of partial bracket shell members (such as the top bracket partial shell member 9 and bottom bracket partial shell member 11) such that the ends of the full round tube members interface with the interior surface of the partial shell members 11,12 such that they can be joined to the partial bracket shell members 11,12 using friction stir welding, where two or more partial bracket shell members (such as the bottom bracket partial shell members 11,12) are later joined to each other along to complete a fully formed cylindrical tube that acts as the bracket shell (either top or bottom) that joins the tubular members into the frame assembly. While the method of construction is generally the same for joining tubular components to the top bracket partial shell members 9,10 as the bottom bracket partial shell members 11,12 and is similar for joining the top bracket partial shell members 9,10 together to complete the full top bracket shell as for the bottom bracket shell members 11,12, for purposes of describing the friction stir welding construction of the bicycle frame according to one embodiment of the present invention, the process is shown and described particularly with reference to construction of the bottom shell bracket. Furthermore, substantially the same process can be used to join an end of certain tube members (such as one end of the top tube 1) to the curved surface of the head tube 15 (which can be seen, for example, in FIG. 6).

Figure 9:
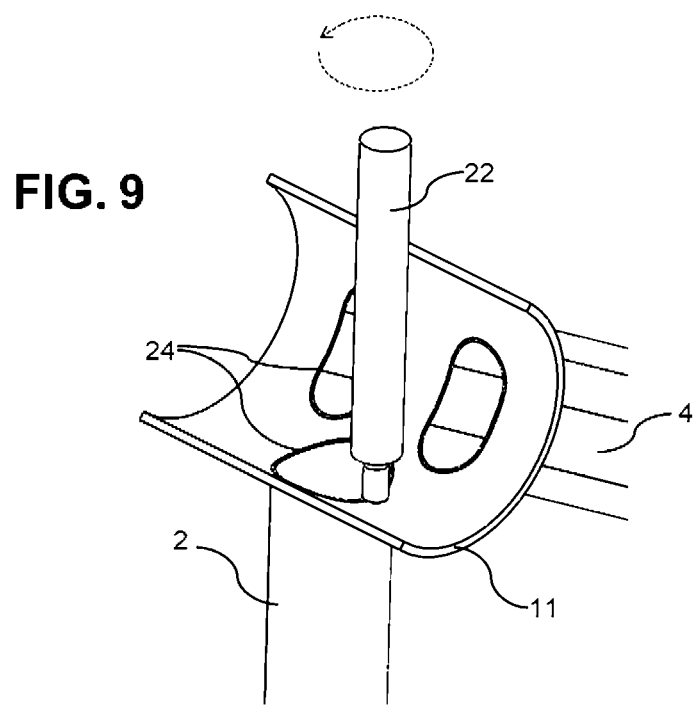
FIG. 9 illustrates a portion of a method of construction of a bicycle frame according to one embodiment of the present invention, particularly showing the joining of a tubular end of a seat tube to a partial bracket shell member of the bottom racket using friction stir welding.
Figure 10:
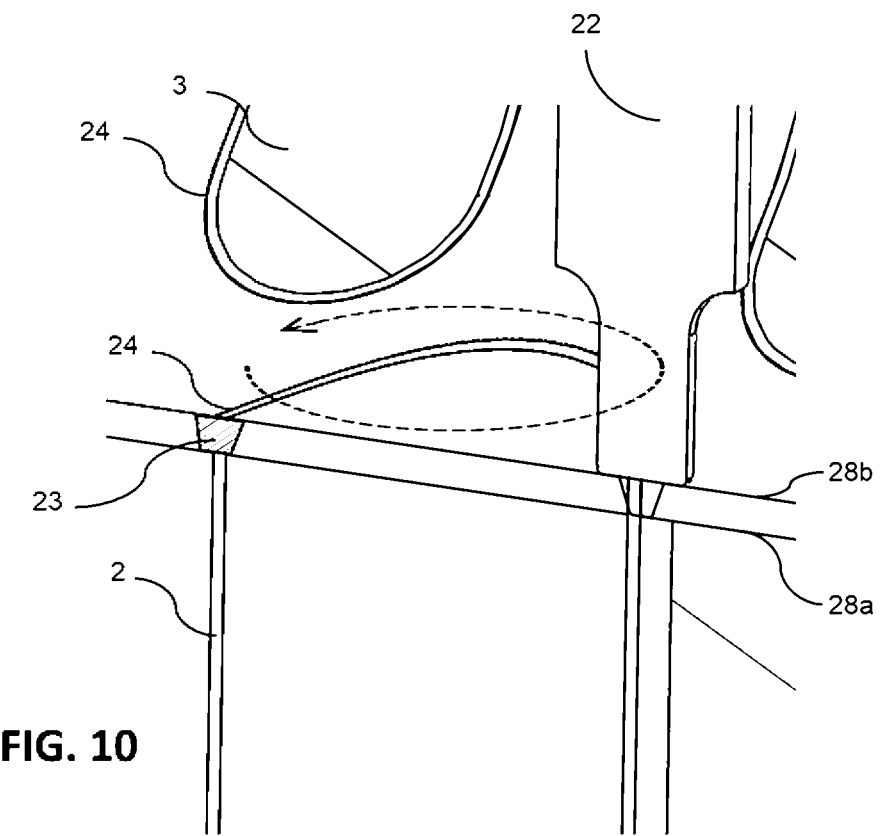
FIG. 10 is a cross-sectional view illustrating a portion of a method of construction of a bicycle frame according to one embodiment of the present invention, particularly showing a temporary anvil installed on a backside of a plug and another temporary anvil installed on a backside of a bottom bracket partial bracket shell member.

As shown in FIG. 9, a first bottom shell partial bracket member 11 is provided, where the bottom shell partial bracket member 11 has a generally semi-circular cross section, so that when two partial bracket members (such as the bottom shell partial bracket members 11,12) are joined (as described more fully below), the full cylindrical tube bracket is formed. Each of the partial bracket members 11,12 is operable to receive the ends of distinct tubular components of the bicycle frame. So, for example, in the view provided in FIG. 9, the first bottom shell partial bracket member 11 is operable to receive an end of the seat tube 2 and an end of each of the down tubes 3,4 such that those ends extend through the exterior surface of the partial bracket member 11 and interface with the interior surface of the partial bracket member 11. A friction stir welding tool 22 is used to adjoin the ends of these tube components (the seat tube 2 and down tubes 3,4) to the inner surface of the partial bracket shell member 11, as shown in FIGS. 9-12. As shown, in the preferred embodiment for joining the tube ends to the partial bracket shell member, the tool path circumscribes the tube end to join it to the partial bracket shell member 11. In this regard, as shown, the tool path circumscribes, for example, the seat tube 2 end at the bottom bracket partial shell member 11 to weld the components together along their interface. Once tubes are adjoined to their corresponding partial shell members, the partial shell members are joined together (as discussed more below) to form the overall frame structure.

Figure 11:
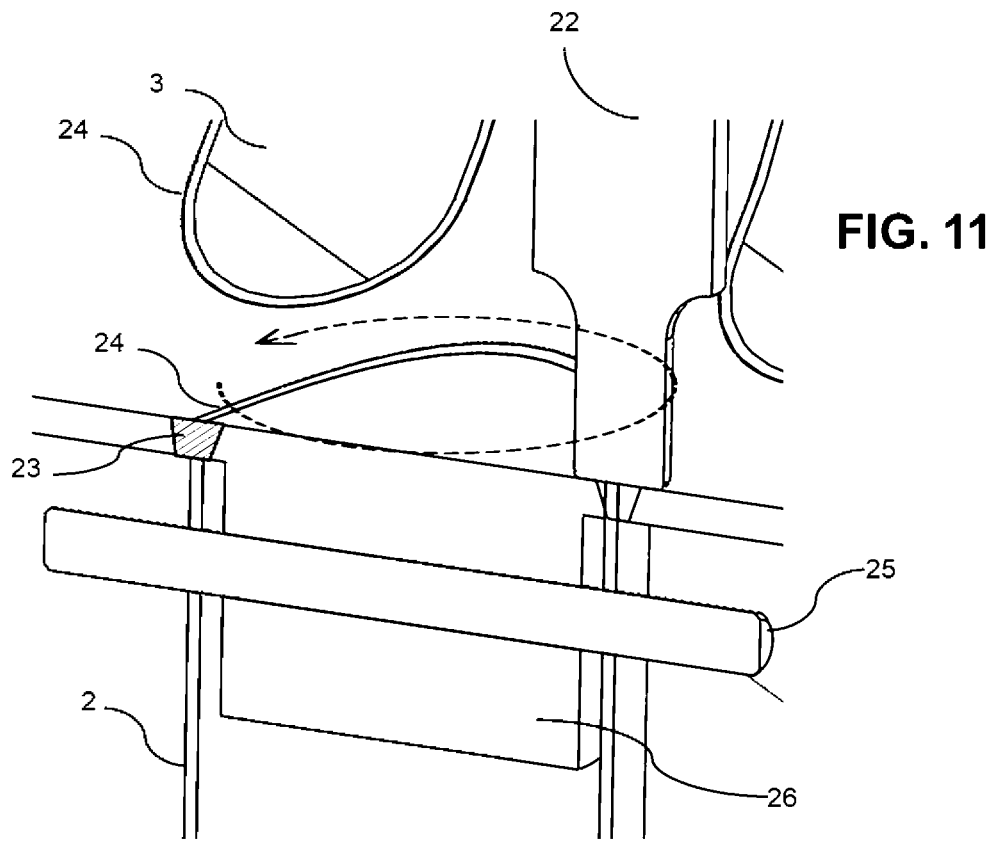
FIG. 11 is a cross-sectional view illustrating a portion of a method of construction of a bicycle frame according to one embodiment of the present invention, particularly showing a plug with backside boss and a pin inserted through a tube and plug to reach friction stir welding forces.
Figure 12:
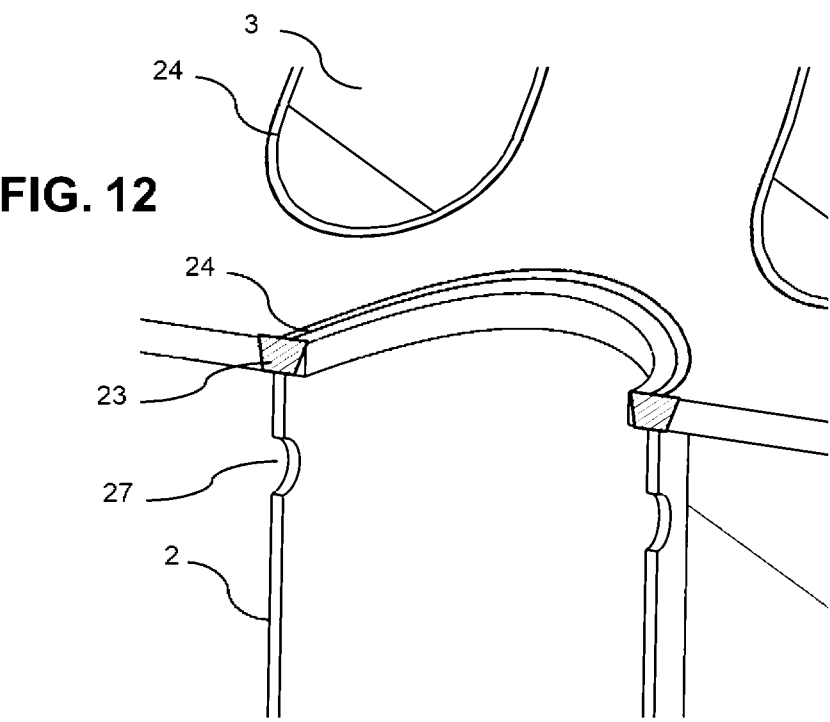
FIG. 12 is a cross-sectional view illustrating a portion of a method of construction of a bicycle frame according to one embodiment of the present invention, particularly showing a tube plug drilled out after welding to reduce weight, leaving a weld nugget intact.
Figure 13:
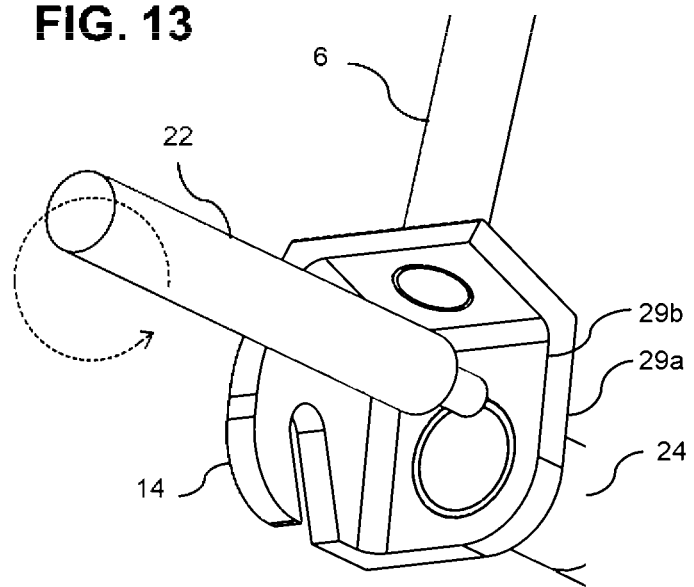
FIG. 13 illustrates a portion of a method of construction of a bicycle frame according to one embodiment of the present invention, particularly showing a friction stir welding tool path circumscribing a seam between a tubular member (such as the chain stay tube) and a flat structural member (such as a surface of a rear dropout).

A tube press fit plug 26 may be utilized at the end of each of the tube members to seal the ends of the tubes at the bracket shell (such as the bottom bracket partial shell member 11) surface. In the preferred embodiment, a temporary anvil is installed on the backside of the plug. Another temporary anvil is installed on the backside of the bottom bracket partial shell member 11 surrounding the seat tube 2. The anvils act as backing supports for the friction stir welding. In one embodiment, a pin 25 is inserted through the tubular member (such as the seat tube 2, as shown in FIG. 11) and the tube plug 26 in order to react friction stir welding forces. Where only a thin plug press 26 is fit into the end of the tube, the FSW tool 22 is reacting a significant portion of its total force onto the perimeter of the plug 26. While in most cases the plug 26 becomes welded to the tube as the FSW tool 22 stirs the interface together, it can sometimes be difficult to get a thin plug 26 to press fit into the tube end the same way every time with very tight tolerances. Therefore, sometimes the FSW tool 22 could push the plug 26 further into the tube before it becomes welded to the tube. FSW tools 22 do not perform well when the workpieces are not planar (i.e. do not interface correctly at the inner surface of the partial bracket member). Thus, in some cases, this can result in an uneven weld that might have lack of consolidation (i.e. a poor quality weld). Thus, in one embodiment it is desirable to use a longer plug 26 that gets pinned 25 to the tube to hold it in place that way the FSW tool 22 forces react onto the plug 26, into the pin 25, and into the tube which are secured by fixturing. In this embodiment, the plug 26 is not relying solely on being press fit into the tube end with tight tolerances, and thus, it is less likely the plug 26 gets forced further into the tube during FSW. In one embodiment, the tube plug 26 can be machined/drilled out after welding to reduce weight, as shown in FIG. 12, leaving the weld nugget 23 intact. The holes in the tube from the temporary pin 25 can be plugged with a rubber plug/grommet and painted to mitigate moisture intrusion into the tube. As shown in the cross-sectional views, weld nuggets 23 denote where the friction stir weld has occurred, providing context to the metallurgically bonded area.

While the above description is with regard to using friction stir welding to adjoin the tubular components of the bicycle frame to the partial bracket members of the cylindrical brackets, friction stir welding is also useful for joining some of the tubular components (e.g. chain stay tubes 7,8, etc.) to flat structural members, such as end fittings like the dropouts (rear 13,14 or fork 19,20). One embodiment of this is shown, for example, in FIG. 13. In one embodiment, the friction stir welding tool 22 path circumscribes an interface seam between the tube (such as the chain stay tube 24) and the flat structural member of an end fitting (such as the surface of a rear dropout 14). A plug can be installed inside the tube and temporary anvils are used to react to FSW forces, as described previously.

It may be seen that many of the individual tube components will be joined at each of its ends to either a partial shell member or end fitting such that the tube component extends between the two adjoined end components (e.g. partial shell member to partial shell member or partial shell member to end fitting). So, for example, the following list shows one possibility for types of tubular components connected to end components: (a) the top tube 1 is joined using the above described process to a first bracket partial shell member 9 on one end of the top tube 1 and to the surface of the head tube 15 at the other end of the top tube 1; (b) each of the down tubes 3,4 is joined using the above described process to a bottom bracket partial shell member 11 at one end of the down tubes 3,4 and to the surface of the head tube 15 at the other end of the down tubes 3,4; (c) the seat tube 2 is joined using the above described process to a top bracket partial shell member 9 on one end of the seat tube 2 and to a bottom bracket partial shell member 11 at the other end of the seat tube 2; (d) each of the chain stay tubes 7,8 is joined using the above described process to a bottom bracket partial shell member 12 at one end of the chain stay tubes 7,8 and to the rear dropout flat structural members 13,14 at the other end of the chain stay tubes 7,8; and (e) each of the seat stay tubes 5,6 is joined using the above described process to a top bracket partial shell member 9 at one end of the seat stay tubes 5,6 and to the rear dropout flat structural members 13,14 at the other end of the seat stay tubes 5,6.

For further description of one embodiment of the present invention, the following examples may be provided. In one embodiment, the components can be joined as follows: (a) a back end of the top tube 1 and a top end of the seat tube 2 are both joined to a front partial bracket member 9 of the top bracket shell, (b) a front end of the top tube 1 and a front end of the down tubes 3,4 are both joined to the surface of the head tube 15, and (c) a bottom end of the seat tube 2 and back end of the down tubes 3,4 are joined to a front partial bracket member 11 of the bottom bracket shell. In this embodiment, these connections form the generally triangular front portion of the frame. And the generally triangular back portion of the frame is formed as follows: (a) a front end of the seat stay tubes 5,6 is connected to either a back partial bracket member 10 of the top bracket shell or to the front partial bracket member 9 of the top bracket shell, (b) a front end of the chain stay tubes 7,8 is connected to a back partial bracket member 12 of the bottom bracket shell, and (c) both the back end of the seat stay tubes 5,6 and the back end of the chain stay tubes 7,8 are joined to the flat structural surfaces 29 of the real dropouts 13,14. As can be determined from these example connections, the generally triangular front portion includes both the front partial bracket member 9 of the top bracket shell and the front partial bracket member 11 of the bottom bracket shell, while the generally triangular back portion includes, in one embodiment, both the back partial bracket member 10 (or the front partial bracket member 9 in another embodiment) of the top bracket shell and the back partial bracket member 12 of the bottom bracket shell. Thus, to join the generally triangular front portion and generally triangular back portion together to create the bicycle frame having two generally triangular sections, all that is required is to connect the top partial bracket members 9,10 to create the top bracket shell and to connect the bottom partial bracket members 11,12 to create the bottom bracket shell, which rigidly connects all the tubular components connected to those partial bracket members.

Figure 14:
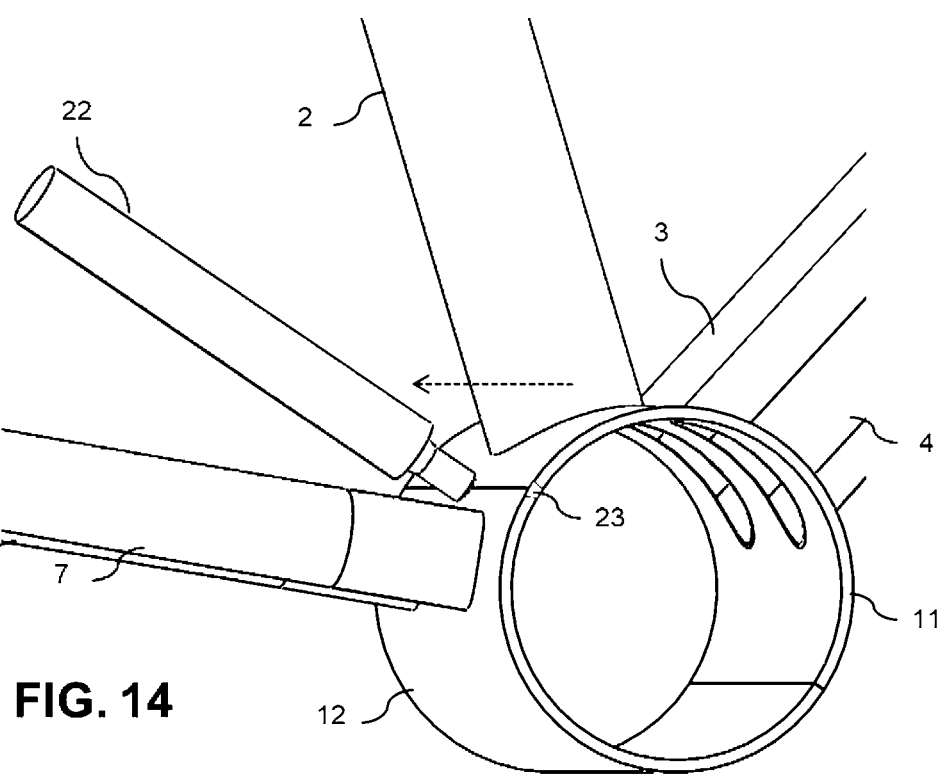
FIG. 14 illustrates a portion of a method of construction of a bicycle frame according to one embodiment of the present invention, particularly showing a friction stir welding tool path linear along a seam between a first partial bracket shell member and a second partial bracket shell member of the bottom bracket shell, and where a temporary anvil is installed inside the cylindrical portion that makes up the bottom bracket shell.
Figure 15:
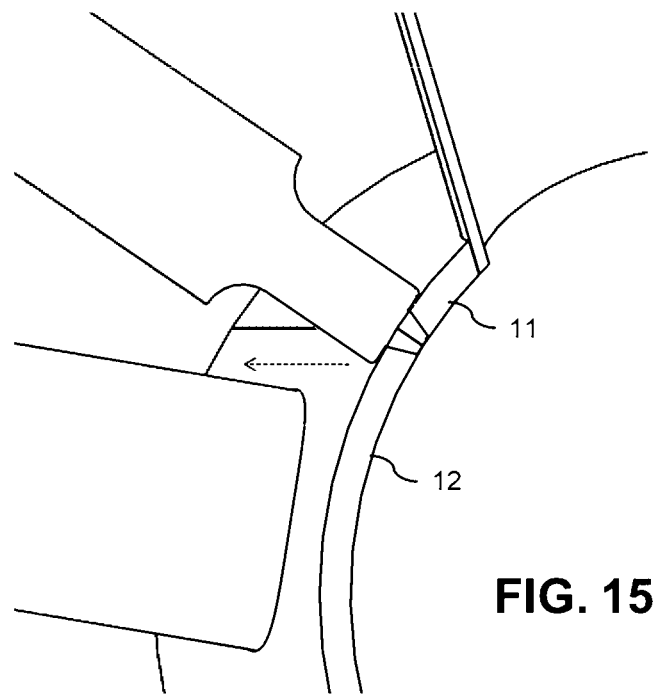
FIG. 15 is a cross-sectional view illustrating a portion of a method of construction of a bicycle frame according to one embodiment of the present invention, particularly showing a friction stir welding tool path linear along a seam between a first partial bracket shell member and a second partial bracket shell member of the bottom bracket shell.
Figure 16:
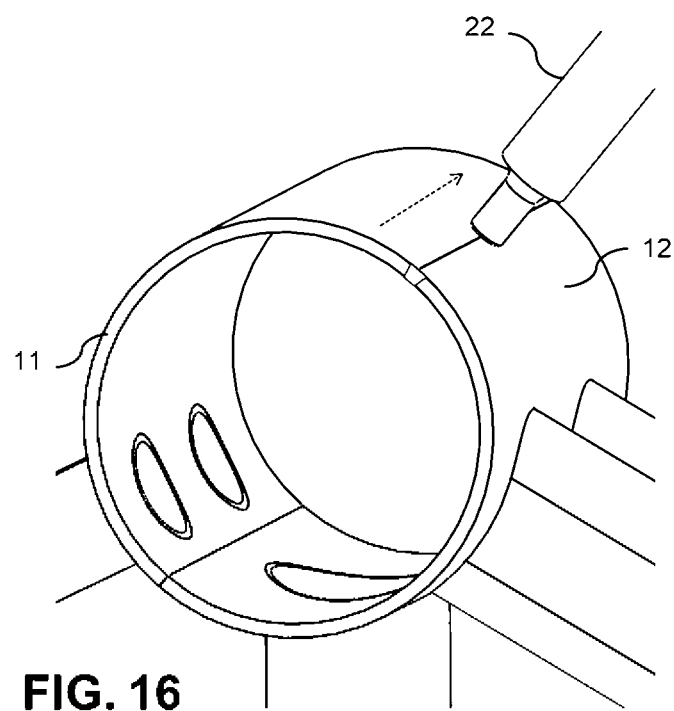
FIG. 16 illustrates a portion of a method of construction of a bicycle frame according to one embodiment of the present invention, particularly showing a friction stir welding tool path linear along a seam between a first partial bracket shell member and a second partial bracket shell member of the bottom bracket shell.

The connection of the partial bracket members to create the full top bracket shell and bottom bracket shell can be described with reference to FIGS. 14-16. As shown, in the preferred embodiment a friction stir welding tool 22 is moved along a tool path linear or curvilinear (meaning that the tool path can be a smooth curve with no discontinuities) along an interface seam between the partial bracket members. In one embodiment, a temporary anvil is installed inside the cylindrical portion of the bracket shell. For example, FIGS. 14-16 show a back partial bracket member 12 and front partial bracket member 11 being joined to form a full bottom bracket shell. As shown, for example, the back partial bracket member 12 is connected to the chain stay tubes 7,8 according to the process described previously and the front partial bracket member 11 is connected to the seat tube 2 and down tubes 3,4 according to the process described previously. The joining of the front partial bracket member 11 and back partial bracket member 12 to form the full bottom bracket shell results in the rigid connection of the chain stay tubes 7,8, seat tube 2, and down tubes 3,4, via the bottom bracket shell. A similar technique is utilized to join the front partial bracket member 9 and back partial bracket member 10 of the top bracket shell. The joining of the top bracket shell results in the rigid connection of the seat stay tubes 5,6, seat tube 2, and top tube 1. And because the seat tube 2 is connected to both the top bracket shell and bottom bracket shell, the joining of the bracket members to create the top bracket shell and the bottom bracket shell result in the rigid connection of all the components to create the generally double-triangular configuration of the bicycle frame. In one embodiment, the weld seam of the top bracket shell can only be accessed when the seat stay tubes 5,6 are not in place, and thus, once the bottom bracket shell is fully welded, then the seat stay tubes 5,6 and second partial bracket member of the top bracket shell can be welded to rigidly connect the front triangular portion of the frame and back triangular portion of the frame through the top bracket shell and bottom bracket shell.

Figure 22:
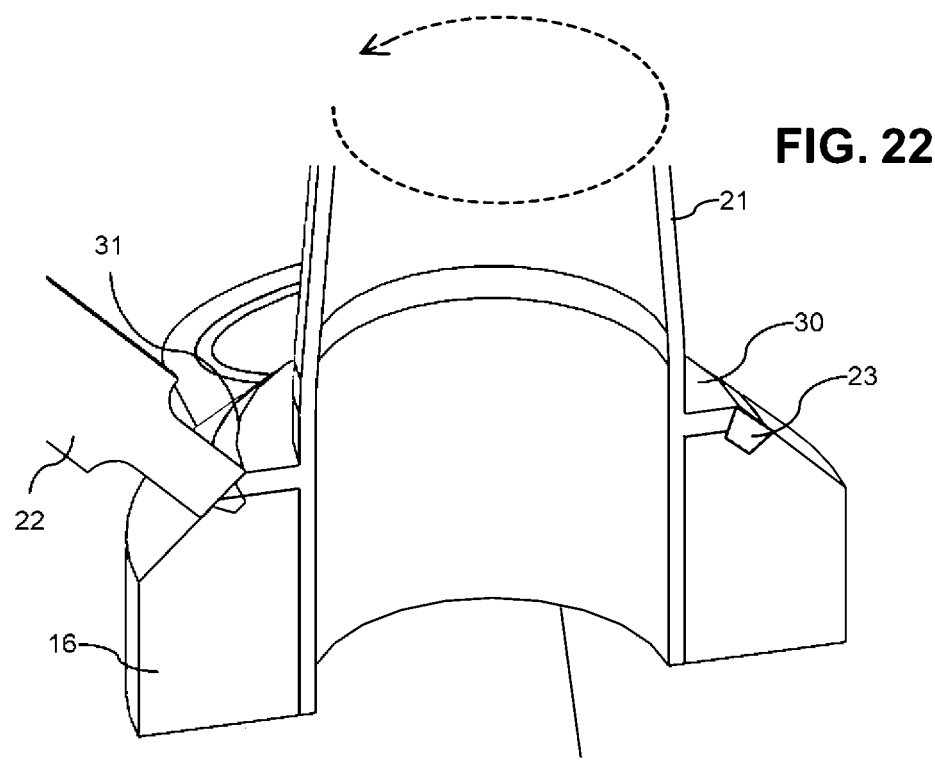
FIG. 22 is a cross-sectional view illustrating a portion of a method of construction of a bicycle fork according to one embodiment of the present invention, particularly showing a friction stir welding tool path circumscribing a tube collar (of a steerer tube) to join it to a structural junction (at the fork crown).
Figure 23:
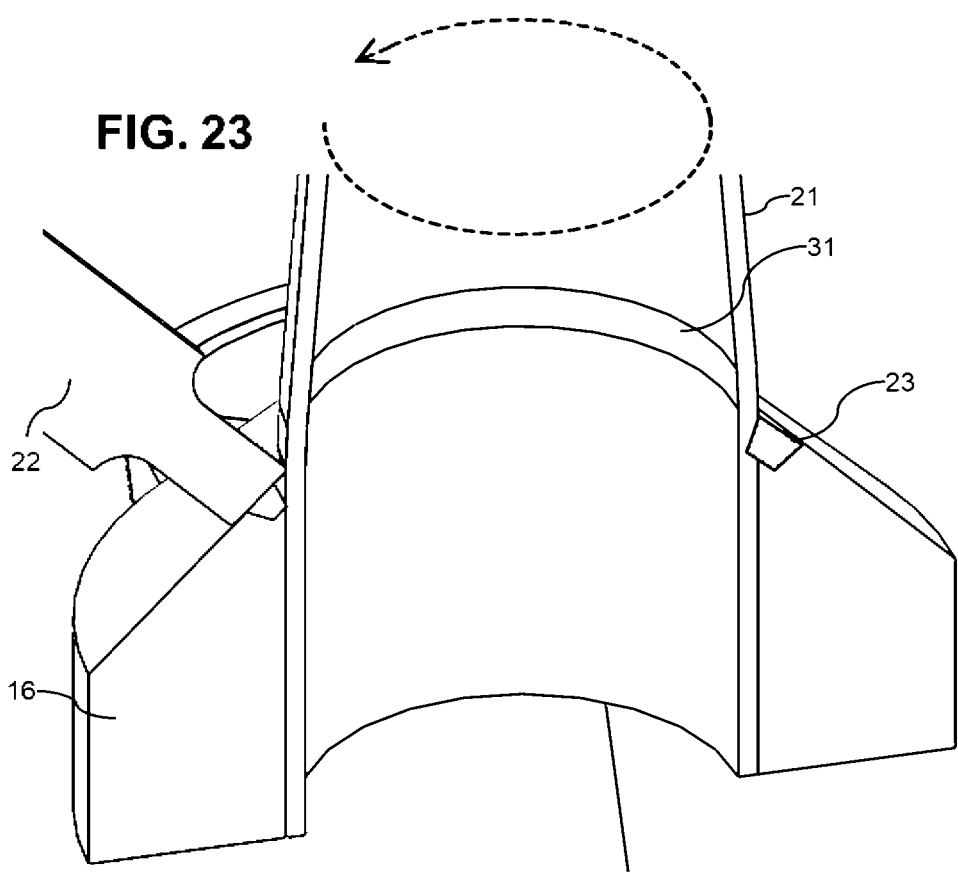
FIG. 23 is a cross-sectional view illustrating a portion of a method of construction of a bicycle fork according to one embodiment of the present invention, particularly showing a friction stir welding tool path circumscribing a tube (steerer tube) with no collar to join it to a fork crown.
Figure 24:
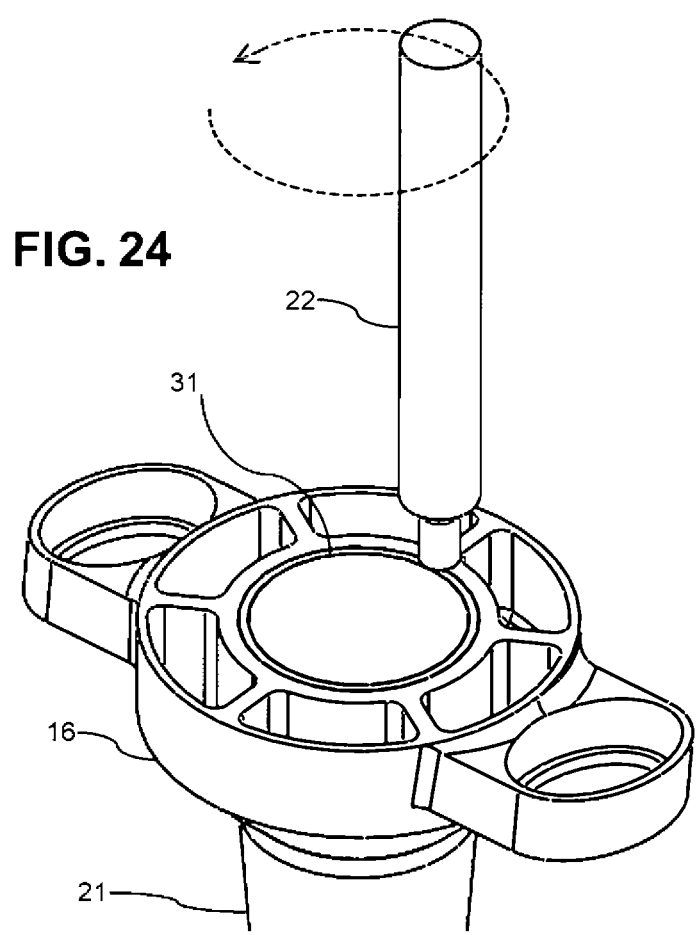
FIG. 24 illustrates a portion of a method of construction of a bicycle fork according to one embodiment of the present invention, particularly showing a friction stir welding tool path circumscribing a tube end (of a steer tube) to join it to a structural junction (at a fork crown).
Figure 25:
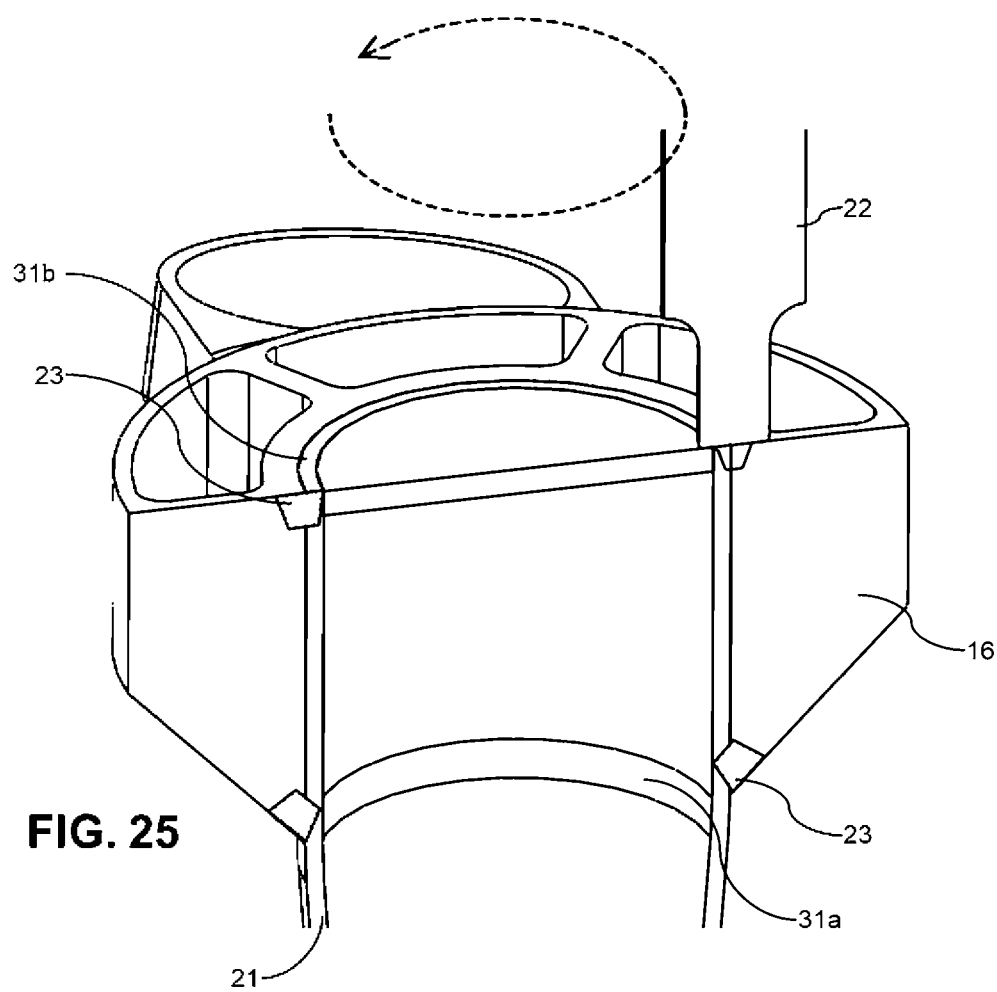
FIG. 25 is a cross-sectional view illustrating a portion of a method of construction of a bicycle fork according to one embodiment of the present invention, particularly showing a friction stir welding tool path circumscribing a tube end (of a steerer tube) to join it to structural junction (at a fork crown).
Figure 26:
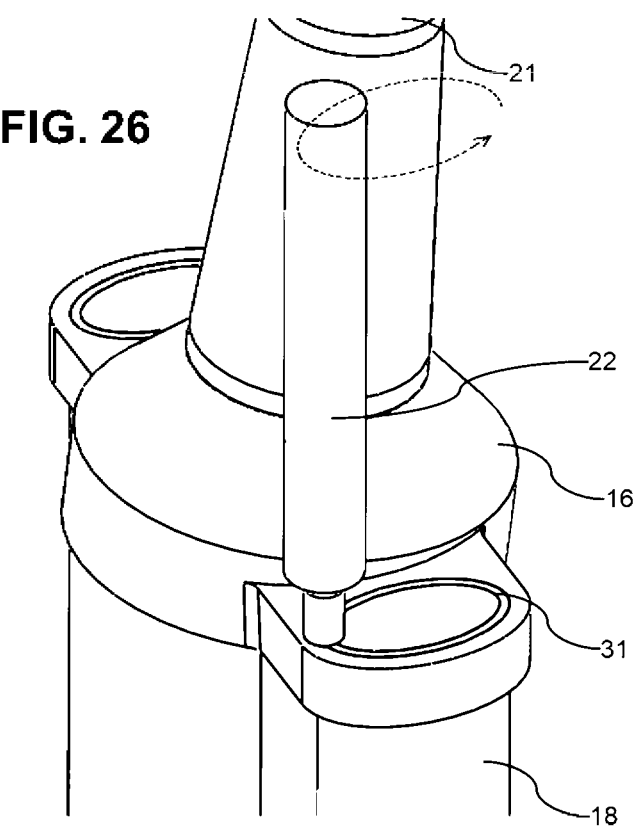
FIG. 26 illustrates a portion of a method of construction of a bicycle fork according to one embodiment of the present invention, particularly showing a friction stir welding tool path circumscribing a tube end (of a fork tube) to join it to a structural junction (at a fork crown).
Figure 27:
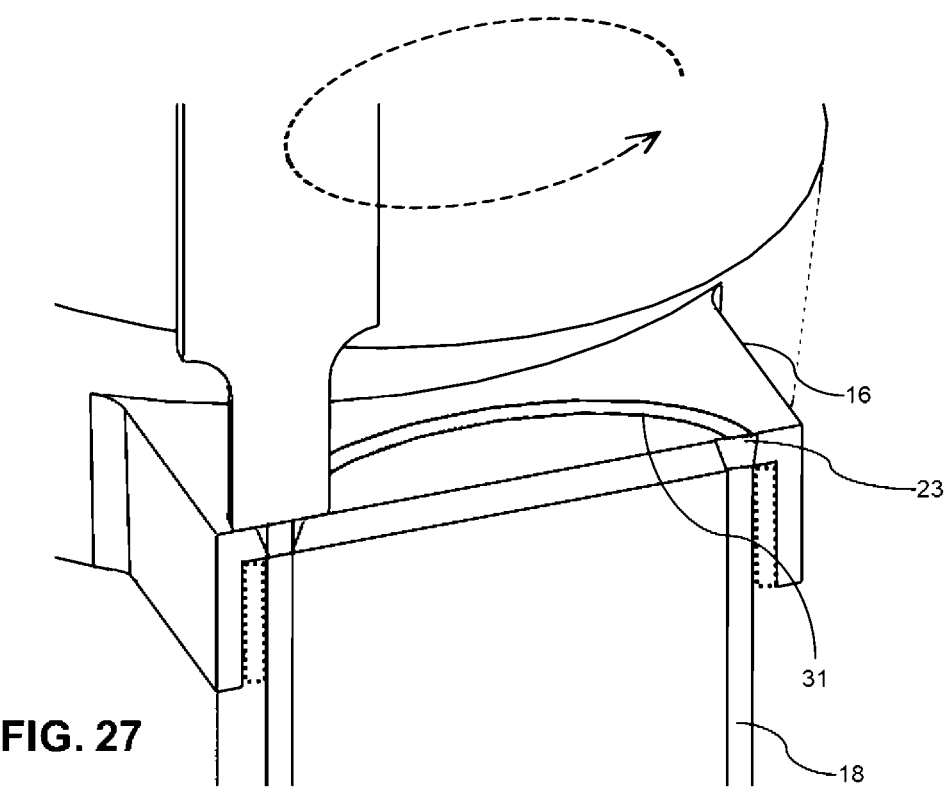
FIG. 27 is a cross-sectional view illustrating a portion of a method of construction of a bicycle fork according to one embodiment of the present invention, particularly showing a friction stir welding tool path circumscribing a tube end (of a fork tube) to join it to a structural junction (at a fork crown).
Figure 28:
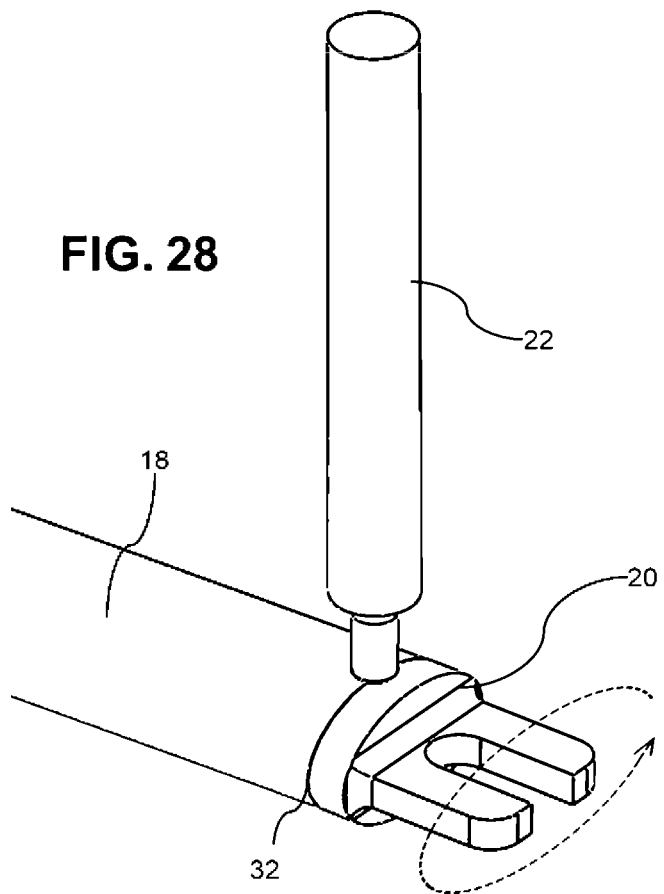
FIG. 28 illustrates a portion of a method of construction of a bicycle fork according to one embodiment of the present invention, particularly showing a friction stir welding tool path circumscribing perpendicular to a tube end (of a fork tube) to join it to a structural connector (of a front dropout).
Figure 29:
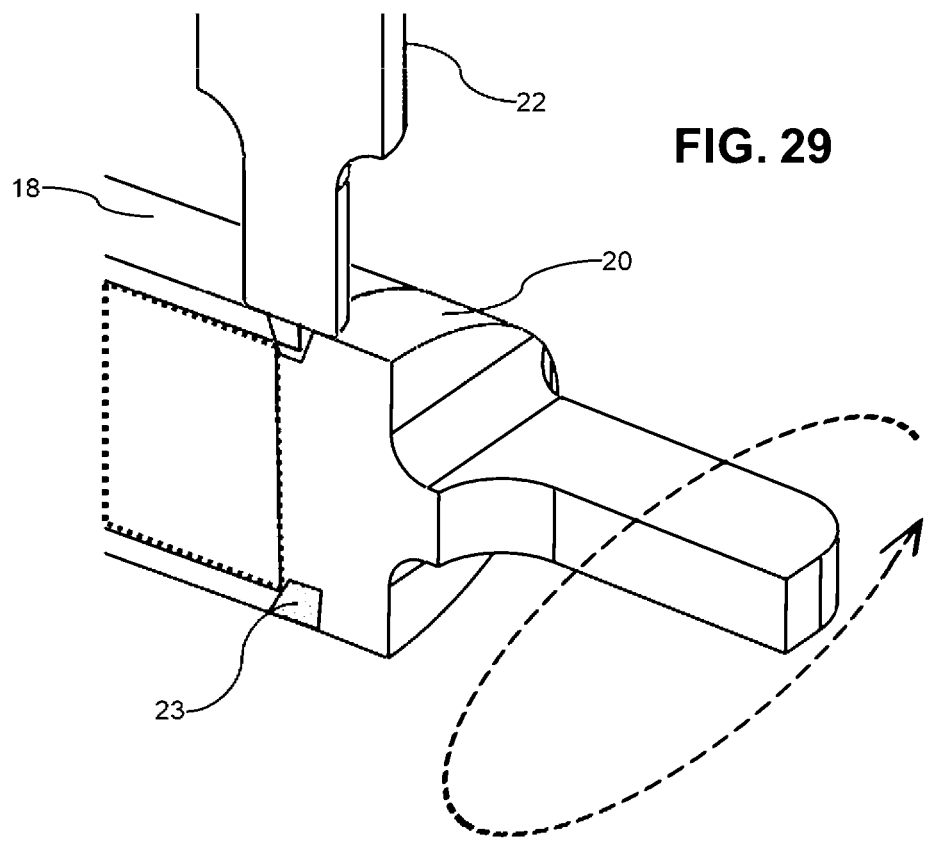
FIG. 29 is a cross-sectional view illustrating a portion of a method of construction of a bicycle fork according to one embodiment of the present invention, particularly showing a friction stir welding tool path circumscribing perpendicular to a tube end (of a fork tube) to join it to a structural connector (of a front dropout).
Figure 30:
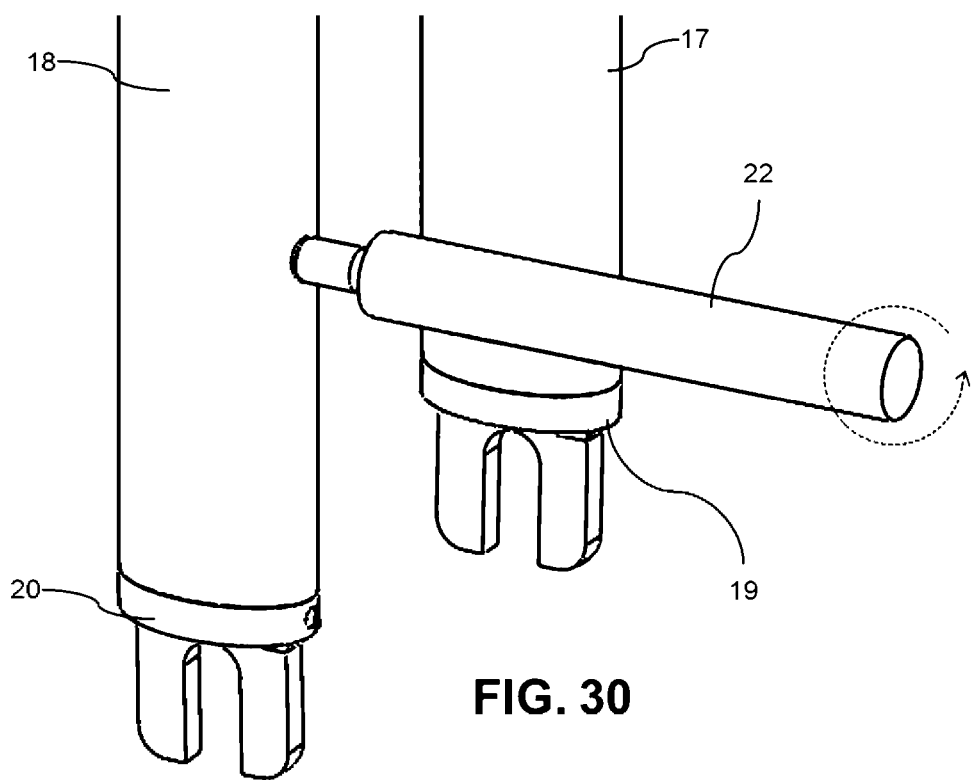
FIG. 30 illustrates a portion of a method of construction of a bicycle fork according to one embodiment of the present invention, particularly showing a friction stir welding tool path for making a small circular friction stir weld or friction stir spot weld.
Figure 31:
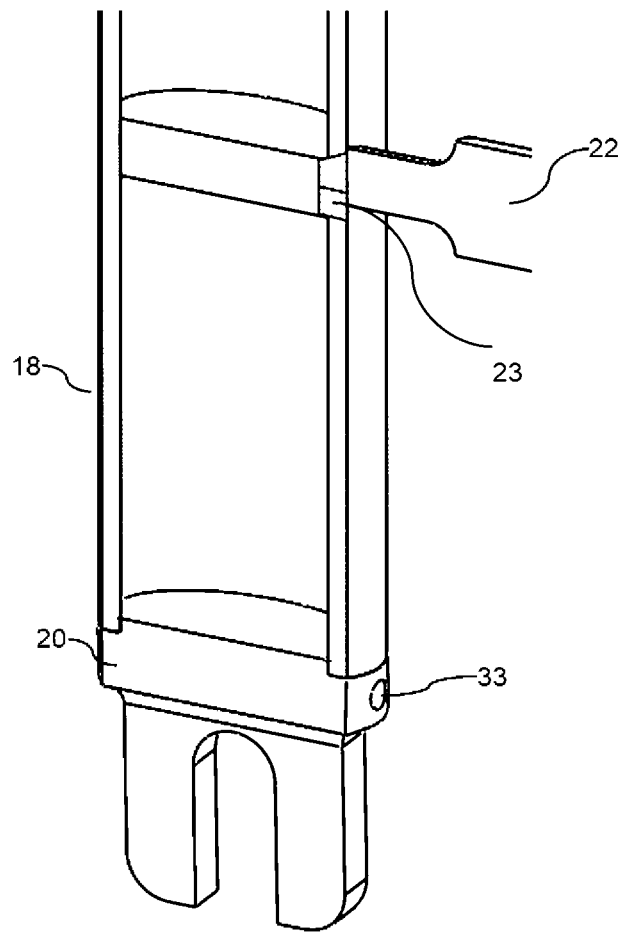
FIG. 31 is a cross-sectional view illustrating a portion of a method of construction of a bicycle fork according to one embodiment of the present invention, particularly showing a friction stir welding tool path for making a small circular friction stir weld or friction stir spot weld.
Figure 32:
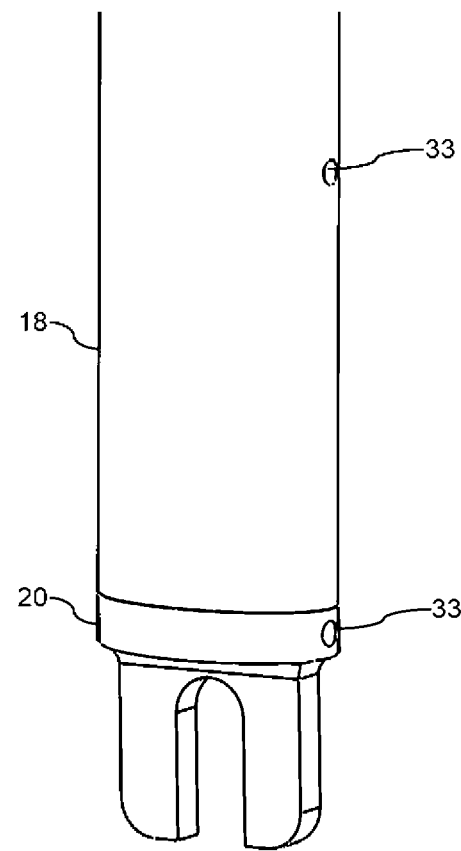
FIG. 32 illustrates a portion of a method of construction of a bicycle fork according to one embodiment of the present invention, particularly showing a hole drilled into friction stirred area enabling a disc brake to be mounted and eliminating crevice between plug and tube.
Figure 33:
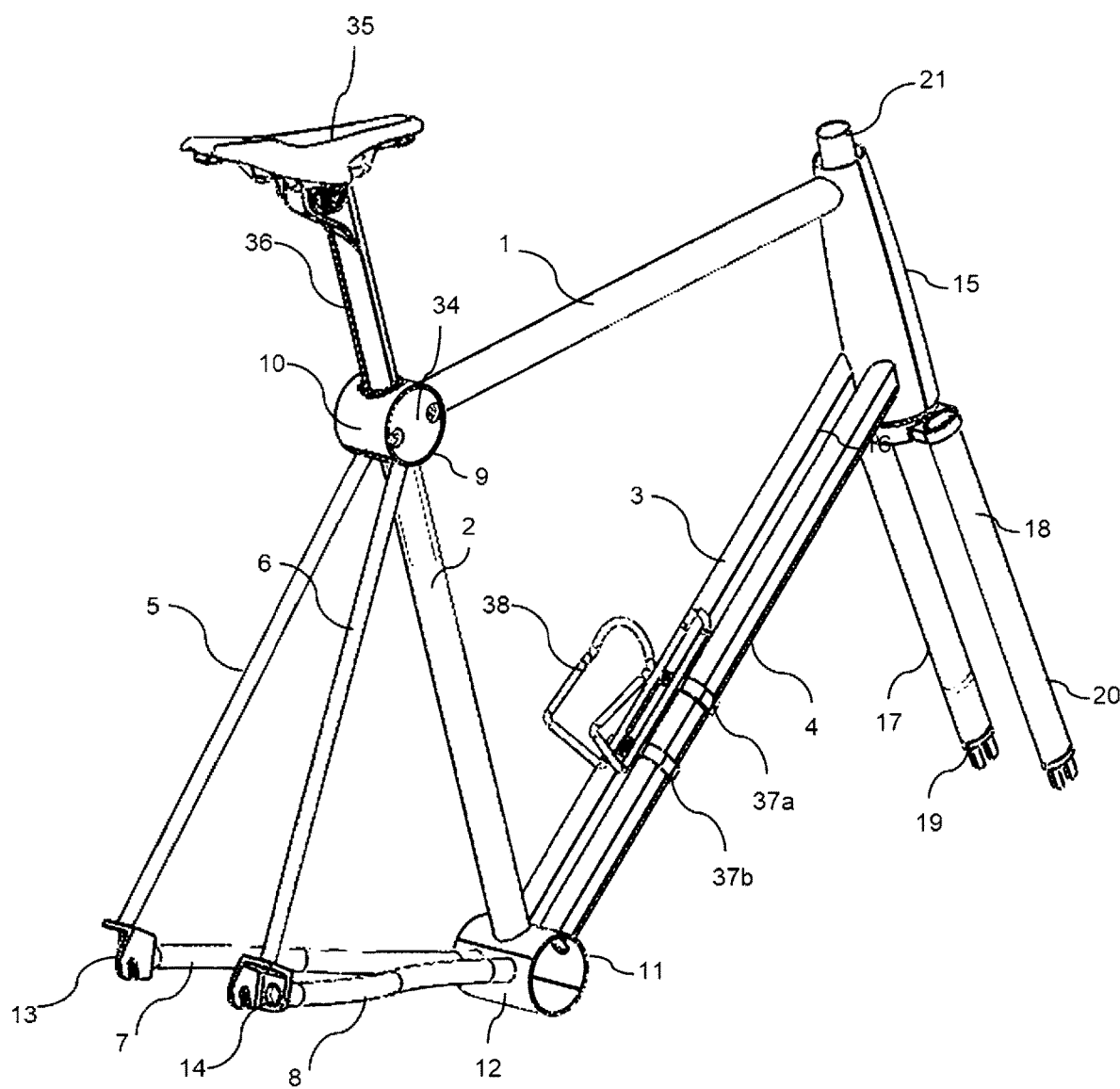
FIG. 33 illustrates a constructed bicycle frameset (and additional bicycle components affixed thereto) according to one embodiment of the present invention.
Figure 34:
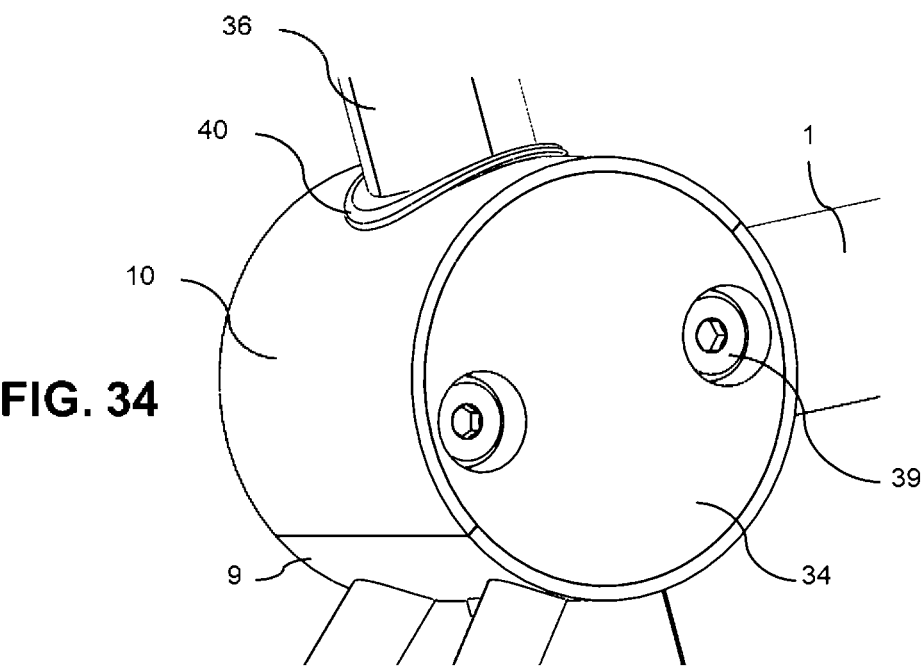
FIG. 34 illustrates one view of a constructed top bracket of a bicycle frame according to one embodiment of the present invention, implementing a seat post adjuster mechanism for adjusting a seat post received in the top bracket.
Figure 35:
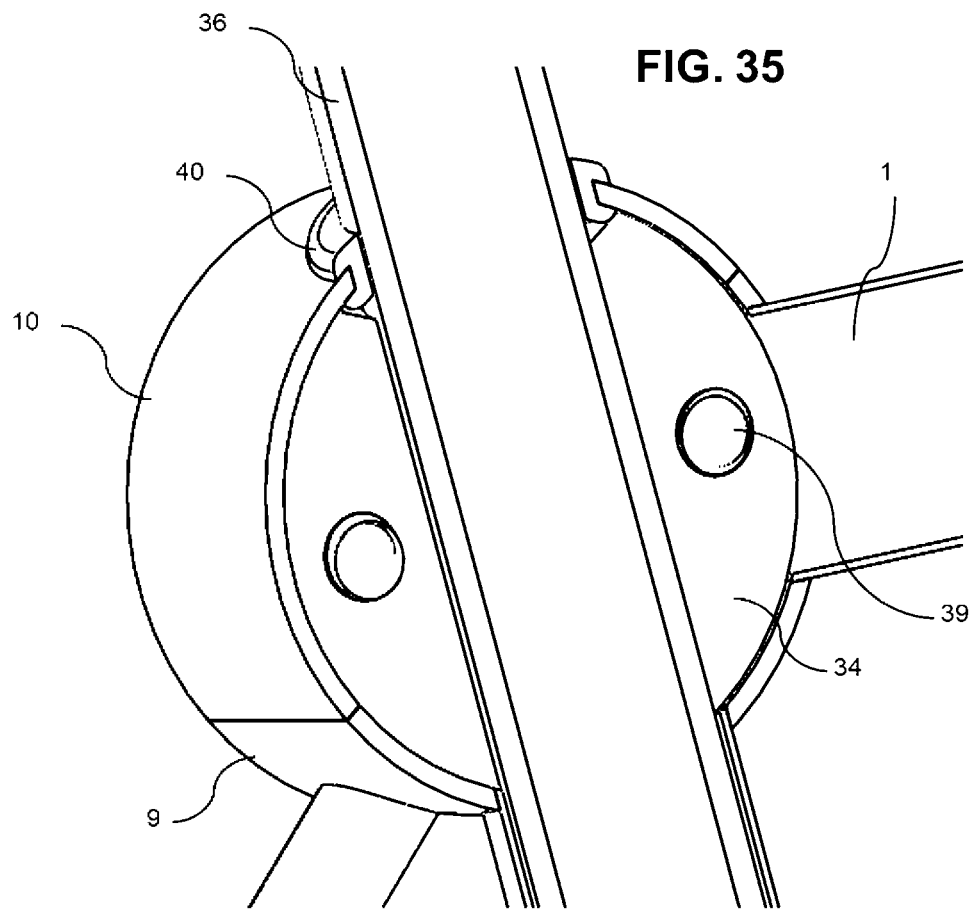
FIG. 35 is a cross-sectional view illustrating a constructed top bracket of a bicycle frame according to one embodiment of the present invention, implementing a seat post adjuster mechanism for adjusting a seat post received in the top bracket.
Figure 36:
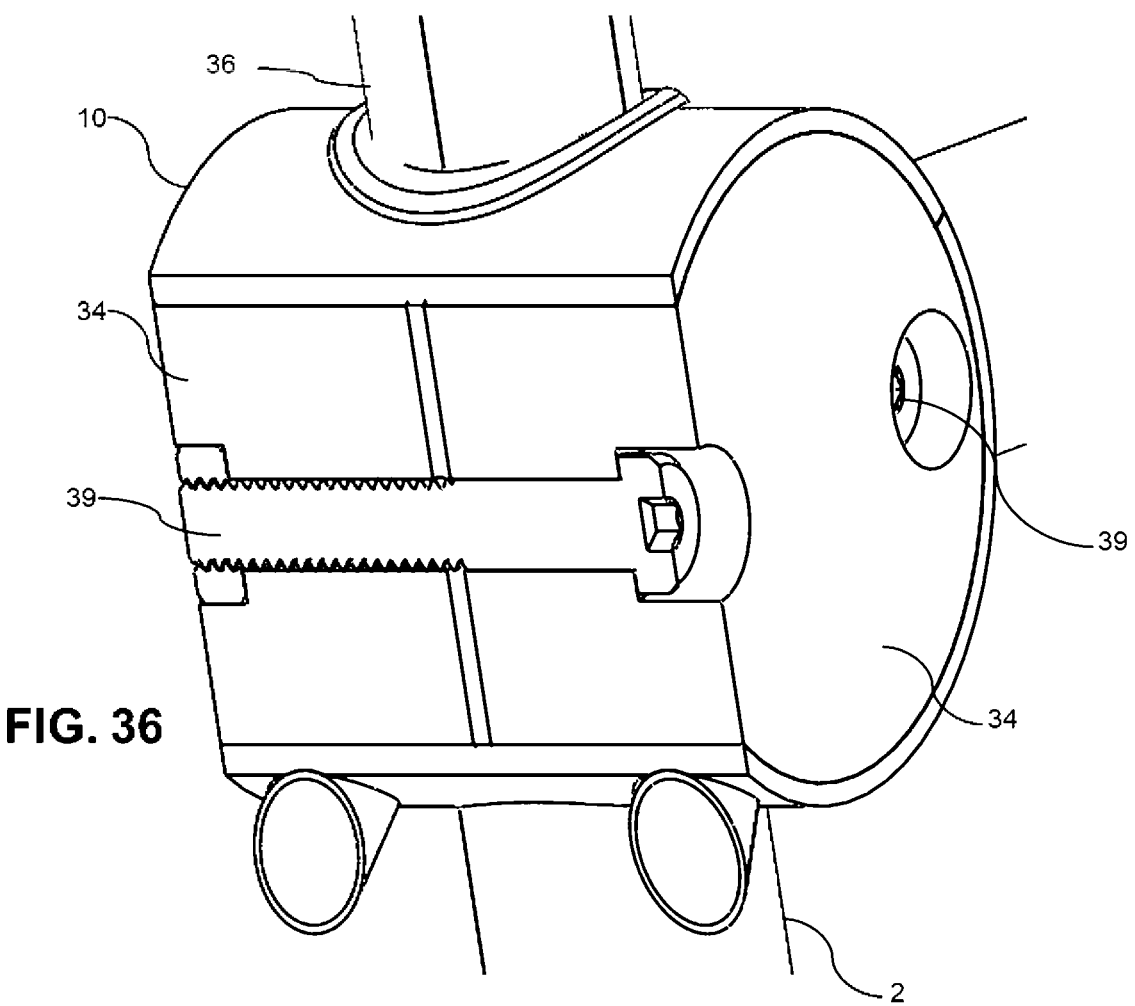
FIG. 36 is another cross-sectional view illustrating a constructed top bracket of a bicycle frame according to one embodiment of the present invention, implementing a seat post adjuster mechanism for adjusting a seat post received in the top bracket.
Figure 37:
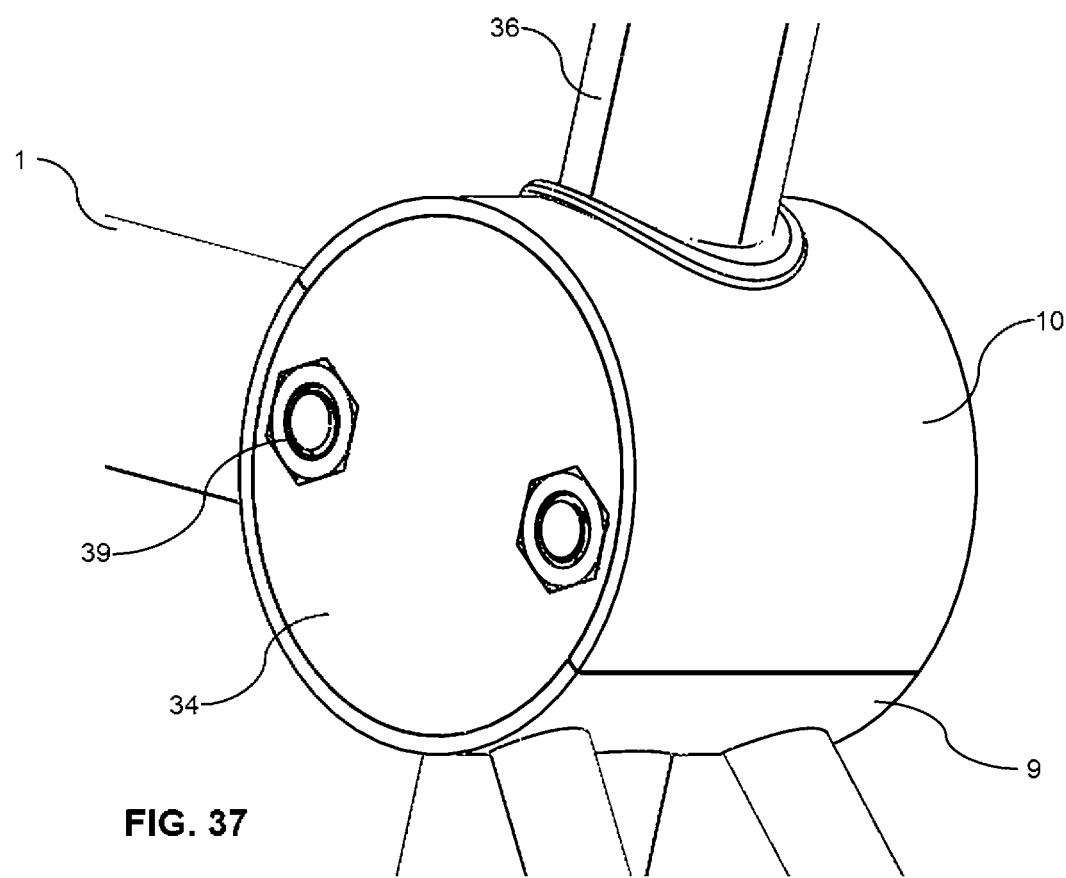
FIG. 37 illustrates one view of a constructed top bracket of a bicycle frame according to one embodiment of the present invention, implementing a seat post adjuster mechanism for adjusting a seat post received in the top bracket.

As noted above, the frameset generally includes a frame and a fork, where the fork, as discussed in depth previously, includes a number of tubular components connected to and extending from a fork crown. As with the frame of the present invention, the preferred embodiment of the fork of the frameset is instructed using friction stir welding. As shown in FIGS. 22, for example, a friction stir welding tool 22 is used in a tool path circumscribing the steerer tube 21 to join the steerer tube 21 to a structural junction (a collar 30) at the crown 16. In another embodiment, as shown in FIG. 23, friction stir welding is used to connect the steerer tube 21 to the crown 16 where there is no a collar. Utilizing no collar 30 provides more of a conventional design where the steerer tube 21 is less costly to manufacture, and in such an embodiment, the steerer tube 21 is taper drawn by forcing the tube 21 over a tapered mandrel with hydraulic pressure. However, with the introduction of FSW, the joint is more complicated because the FSW tool 22 has to come very close to the steerer tube 21 as it joins the steerer tube 21 to the crown 16. Thus, utilizing a collar 30 provides an assembly that is easier to FSW to the crown 16 since the FSW tool 22 has more clearance to the steerer tube 21. Furthermore, while conventional no collar designs require the use of a lathe for turning a flat region to install a bearing, utilizing the FSW method with the crown 30 eliminates the need for turning on a lathe, which can be desirable in many cases. In one embodiment, a tube plug is utilized similar to the description provided previously. As shown in FIG. 25, in one embodiment the steerer tube 21 may be welded to the fork crown 16 at two points 31a, 31b along the steerer tube 21 such that a crevice between the steerer tube 21 and fork crown 16 is sealed with welds 31a, 31b from both sides. As shown in FIGS. 26-27, similar friction stir welding tool path and tooling techniques are used to join the fork tube 17,18 ends to the structural junction of the fork crown 16, with a tool path that circumscribes the end of the fork tube 17,18 to join it to the crown 16. Welding nuggets 23, shown in the cross-sectional views, represent the metallurgical bond between the steerer tube 21 and crown 16 (or the crown 16 and fork tubes 17,18) that prevents moisture from intruding between the two components in that crevice. A temporary anvil may be utilized to further facilitate the friction stir welding. Finally, friction stir welding may also be utilized to join the end of the fork tubes 17,18 to the front dropouts 19,20. As shown in FIGS. 28-29, for example, a tool path circumscribing perpendicular to the fork tube 17,18 end may be used to join the fork tube 17,18 end to the front dropouts 19,20. As with the friction stir welding of other components as described previously, a temporary anvil may be utilized to further facilitate the friction stir welding. In one embodiment, as shown in FIGS. 30-32, a friction stir welding pin tool 22 can be utilized to make a small circular friction stir spot weld 33 in the side of a tubular component, such as the fork tube 17,18. In this particular embodiment, the hole 33 may serve as a disc brake mounting hole, and a brake mounting plug can be utilized at the fork tube 17,18. A similar hole 33 can be created in the front dropout 19,20, and these disc break mounting holes 33 enable disc brake to be mounted while eliminating crevices between the plug and fork tube 17,18. The break mounting plug provides a necessary mounting hole 33 for attaching a disc brake. While traditional bike designs require welding a nut or threaded receptacle that can accept a short screw for attaching the brake, the design of the present invention allows for the use of conventionally unweldable alloys, and, therefore, a nut or receptacle cannot simply be added on the side of the fork tube 17,18. Thus, inserting a plug on the inside of the tube and drilling a hole into that plug is utilized for securing the disc brake. However, without friction stir welding that area first, it would be subject to moisture intrusion that could cause crevice corrosion.

Generally speaking, the welding process of the present invention can be applied to any type of metal bicycle components. The metal components can have any shape or size, and can be a tube, rod, bar, plate, or other shapes. Furthermore, the FSW process can occur on any shape of surface, for example planar or flat surfaces, curved surfaces, or combinations of curved and flat.

The frameset materials can be comprised from metal alloys (and non-metals) including, but not limited to, aluminum alloys (2xxx, 3xxx, 5xxx, 6xxx, 7xxx series, and others), titanium alloys, steel alloys, stainless steel alloys, metal matrix composites, and others.

As noted above, it is contemplated that one or more anvils can be utilized during the friction stir welding process of the present invention. While it is contemplated that the anvils can be temporary anvils that are removed after the friction stir welding is complete, in one embodiment the anvil can be left in place after friction stir welding in order to contribute to the strength and stiffness of the bicycle joint and does not need to be open for the flow of any fluids (like in other applications where friction stir welding is used to join tubes to structures, such as in heat exchanger applications). In some cases, the new anvil (or the center portion of the anvil) can be drilled out instead of machining the face. Further, when the anvil is left in place, elimination of the backside crevice between the anvil and tube is needed to avoid crevice corrosion and stress corrosion cracking that occurs in crevices for structurally loaded equipment like bicycles. This is discussed more fully above, and allows the anvil to be removed or left in place, a novel feature over any existing friction stir welding applications.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein. Full round tubes are also inserted into end fittings such as dropouts that provide access for joining the tube ends to the end fittings.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification. When a range is stated herein, the range is intended to include all sub-ranges within the range, as well as all individual points within the range. When "about," "approximately," or like terms are used herein, they are intended to include amounts, measurements, or the like that do not depart significantly from the expressly stated amount, measurement, or the like, such that the stated purpose of the apparatus or process is not lost.

The present invention has been described with reference to certain preferred and alternative embodiments that are intended to be exemplary only and not limiting to the full scope of the present invention, as set forth in the appended claims.

The invention claimed is:

1. A bicycle assembly comprising:
   a. a first tubular member comprising a first interface portion; and
   b. a first partial tube member comprising a first external interface portion and a first internal interface portion;
   wherein the first tubular member is engaged through the first external interface portion of the first partial tube member to create a first closed corner joint, and
   wherein the first interface portion of the first tubular member is friction stir welded to the first interior interface portion of the first partial tube member.

2. The bicycle assembly of claim 1, wherein the first tubular member comprises a second interface portion, and further wherein the bicycle assembly comprises a second partial tube member comprising a first exterior interface portion and a first internal interface portion wherein the first tubular member is engaged through the first exterior interface portion of the second partial tube member to create a second closed corner joint, and wherein the second interface portion of the first tubular member is friction stir welded to the first internal interface portion of the second partial tube member.

3. The bicycle assembly of claim 2, wherein the first tubular member is a seat tube, the first partial tube member is a first top bracket partial shell member, and the second partial tube member is a first bottom bracket partial shell member.

4. The bicycle assembly of claim 2, further comprising:
   a. a second tubular member comprising a first interface portion;
   b. a third tubular member comprising a first interface portion; and
   c. a fourth tubular member comprising a first interface portion;
   wherein second tubular member is engaged through the first exterior interface portion of the first partial tube member;
   wherein the first interface portion of the second tubular member is friction stir welded to the first internal interface portion of the first partial tube member;
   wherein the third tubular member is engaged through the first exterior interface portion of the second partial tube member;
   wherein the first interface portion of the third tubular member is friction stir welded to the first internal interface portion of the second partial tube member;
   wherein the fourth tubular member is engaged through the first exterior interface portion of the second partial tube member; and wherein the first interface portion of the fourth tubular member is friction stir welded to the first internal interface portion of the second partial tube member.

5. The bicycle assembly of claim 4, wherein the first tubular member is a seat tube, the second tubular member is a top tube, the third tubular member is a first down tube, the fourth tubular member is a second down tube, the first partial tube member is a first top bracket partial shell member, and the second partial tube member is a first bottom bracket partial shell member.

6. The bicycle assembly of claim 4, further comprising:
   a. a fifth tubular member comprising a first interface portion and a second interface portion;
   b. a sixth tubular member comprising a first interface portion and a second interface portion;
   c. a seventh tubular member comprising a first interface portion and a second interface portion;
   d. an eight tubular member comprising a first interface portion and a second interface portion;
   e. a third partial tube member comprising a first external interface portion and a first internal interface portion;
   f. a fourth partial tube member comprising a first external interface portion and a first internal interface portion;
   g. a first structural connector member comprising a first interior interface portion and a second interior interface portion;
   h. a second structural connector member comprising a first interior interface portion and a second interior interface portion;
   wherein the fifth tubular member is engaged through the first exterior interface portion of one of the first partial tube member and the third partial tube member;
   wherein the first interface portion of the fifth tubular member is friction stir welded to one of the first internal interface portion of the first partial tube member and the first internal interface portion of the third partial tube member;
   wherein the fifth tubular member is engaged with the first structural connector member;
   wherein the second interface portion of the fifth tubular member is friction stir welded to the first interior interface portion of the first structural connector member;
   wherein the sixth tubular member is engaged through the first exterior interface portion of one of the first partial tube member and the third partial tube member;
   wherein the first interface portion of the sixth tubular member is friction stir welded to one of the first internal interface portion of the first partial tube member and the first internal interface portion of the third partial tube member;
   wherein the sixth tubular member is engaged with the second structural connector member;
   wherein the second interface portion of the sixth tubular member is friction stir welded to the first interior interface portion of the second structural connector member;
   wherein the seventh tubular member is engaged through the first exterior interface portion of the fourth partial tube member;
   wherein the first interface portion of the seventh tubular member is friction stir welded the first internal interface portion of the fourth partial tube member;
   wherein the seventh tubular member is engaged with the first structural connector member;
   wherein the second interface portion of the seventh tubular member is friction stir welded to the second interior interface portion of the first structural connector member;
   wherein the eighth tubular member is engaged through the first exterior interface portion of the fourth partial tube member;
   wherein the first interface portion of the eighth tubular member is friction stir welded the first internal interface portion of the fourth partial tube member;
   wherein the eighth tubular member is engaged with the second structural connector member; and
   wherein the second interface portion of the eighth tubular member is friction stir welded to the second interior interface portion of the second structural connector member.

7. The bicycle assembly of claim 6, wherein the fifth tubular member is a first seat stay tube, the sixth tubular member is a second seat stay tube, the seventh tubular member is a first chain stay tube, the eighth tubular member is a second chain stay tube, the third partial tube member is a second top bracket partial shell member, the fourth partial tube member is a second bottom bracket partial shell member, the first structural connector member is a first rear dropout, and the second structural connector member is a second rear dropout.

8. The bicycle assembly of claim 1, wherein the first tubular member comprises a second interface portion, and further wherein the bicycle assembly comprises a first structural connector member comprising a first interior interface portion, wherein the first tubular member is engaged with the first structural connector member to form a second closed corner joint, and wherein the second interface portion of the first tubular member is friction stir welded to the second interior interface portion of the first structural connector member.

9. The bicycle assembly of claim 1, wherein the first partial tube member comprises a second external interface portion, and further wherein the bicycle assembly comprises a second partial tube member comprising a first external interface portion and a second external interface portion, wherein the second external interface portion of the first partial tube member is engaged with the second external interface portion of the second partial tube member to form a second closed corner joint, and wherein the second closed corner joint is friction stir welded to join the first partial tube member and the second partial tube member.

10. The bicycle assembly of claim 9, further comprising a second tubular member comprising a first interface portion, wherein the second tubular member is engaged through the first external interface portion of the first partial tube member to create a third closed corner joint, and wherein the first interface portion of the second tubular member is friction stir welded to a first interior surface of the first partial tube member.

11. The bicycle assembly of claim 9, further comprising a second tubular member comprising a first interface portion, wherein the second tubular member is engaged through a first external surface of the second partial tube member to create a third closed corner joint, and wherein the first interface portion of the second tubular member is friction stir welded to a first interior surface of the second partial tube member.

12. A method for constructing a bicycle assembly, the method comprising the steps of:
   a. providing a first tubular member comprising a first interface portion and a second interface portion;

b. providing a first partial tubular member comprising a first external interface portion and a first internal interface portion;

c. engaging the first interface portion of the first tubular member through the first external interface portion of the first partial tube member to form a closed corner joint between the first interface portion of the first tubular member and a first interior surface portion of the first partial tube member; and d. friction stir welding the first interface portion of the first tubular member to the first interior surface portion of the first partial tube member.

13. The method for constructing a bicycle assembly of claim 12, the method further comprising the steps of:

a. providing a second partial tube member comprising a first exterior interface portion and a first internal interface portion;

b. engaging the first tubular member through the first exterior interface portion of the second partial tube member to form a closed corner joint between the second interface portion of the first tubular member and a first interior surface portion of the second partial tube member; and c. friction stir welding the second interface portion of the first tubular member to the first internal surface of the second partial tube member.

14. The method of constructing a bicycle assembly of claim 12, further comprising the steps of:

a. providing a first structural connector member comprising a first interior interface portion;

b. engaging the first tubular member with the first structural connector member; and c. friction stir welding the second interface portion of the first tubular member to the second interior interface portion of the first structural connector member.

15. The method of constructing a bicycle assembly of claim 12, further comprising the steps of:

a. providing a second partial tube member comprising a first external interface portion and a second external interface portion;

b. engaging a second external interface portion of the first partial tube member with the second external interface portion of the second partial tube member to form a closed corner joint;

c. friction stir welding the closed corner joint to join the first partial tube member and the second partial tube member.

16. A bicycle assembly comprising:

a. a first tubular member comprising a first interface portion; and b. a first structural connector member comprising a first interface portion;

wherein the first interface portion of the first tubular member is engaged with the first interface portion of the first structural connector member to form a first closed corner joint; and wherein the first interface portion of the first tubular member is friction stir welded to the first interior interface portion of the first structural connector member.

17. The bicycle assembly of claim 16, wherein the first structural connector member further comprises a second interface portion and a third interface portion, and further wherein the bicycle assembly comprises:

a. a second tubular member comprising a first interface portion;

b. a third tubular member comprising a first interface portion;

wherein the first interface portion of the second tubular member is friction stir welded to the second interface portion of the first structural connector member; and wherein the first interface portion of the third tubular member is friction stir welded to the third interface portion of the first structural connector member.

18. The bicycle assembly of claim 17, wherein the second tubular member further comprises a second interface portion, and wherein the third tubular member further comprises a second interface portion, and further wherein the bicycle assembly comprises:

a. a second structural connector member comprising a first interface portion;

b. a third structural connector member comprising a first interface portion;

wherein the second interface portion of the second tubular member is friction stir welded to the first interface portion of the second structural connector member; and wherein the second interface portion of the third tubular member is friction stir welded to the first interface portion of the third structural connector member.

19. The bicycle assembly of claim 18, wherein the bicycle assembly is a bicycle fork.

\* \* \* \* \*